United States Patent
Nishimoto

(10) Patent No.: US 9,755,722 B2
(45) Date of Patent: Sep. 5, 2017

(54) TRANSMISSION DEVICE, RECEPTION DEVICE, COMMUNICATION SYSTEM, TRANSMISSION METHOD AND RECEPTION METHOD

(71) Applicant: Mitsubishi Electric Corporation, Chiyoda-ku (JP)

(72) Inventor: Hiroshi Nishimoto, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/325,580

(22) PCT Filed: Jul. 7, 2015

(86) PCT No.: PCT/JP2015/069544
§ 371 (c)(1),
(2) Date: Jan. 11, 2017

(87) PCT Pub. No.: WO2016/021357
PCT Pub. Date: Feb. 11, 2016

(65) Prior Publication Data
US 2017/0163324 A1 Jun. 8, 2017

(30) Foreign Application Priority Data
Aug. 7, 2014 (JP) ................................. 2014-161689

(51) Int. Cl.
*H04B 7/02* (2017.01)
*H04B 7/06* (2006.01)
(Continued)

(52) U.S. Cl.
CPC ........... *H04B 7/068* (2013.01); *H04B 7/0865* (2013.01); *H04L 1/0058* (2013.01);
(Continued)

(58) Field of Classification Search
CPC ..... H04B 7/068; H04B 7/0865; H04L 5/0007; H04L 27/265; H04L 1/0668; H04L 1/043;
(Continued)

(56) References Cited

U.S. PATENT DOCUMENTS 6,842,487 B1 * 1/2005 Larsson ............... H04B 7/0671
375/260
7,680,200 B2 3/2010 Kwun et al.
(Continued)

FOREIGN PATENT DOCUMENTS

| JP | 2006-129475 A | 5/2006 |
|---|---|---|
| JP | 4988137 B2 | 8/2012 |

(Continued)

OTHER PUBLICATIONS

International Search Report and Written Opinion issued Oct. 6, 2015 in PCT/JP2015/069544 filed Jul. 7, 2015.
(Continued)

*Primary Examiner* — Dac Ha
(74) *Attorney, Agent, or Firm* — Oblon, McClelland, Maier & Neustadt, L.L.P.

(57) ABSTRACT

In a transmission device, a coder performs SFBC block coding of a signal stream includes a divider equally dividing the stream into sub-streams of time lengths $M_{sub}$ and performs a cyclic shift of one or more sub-streams, a processor outputs the sub-streams and performs, on the sub-streams, time-axis inversion processing, complex conjugate processing and sign inversion processing, or the time-axis inversion processing and the complex conjugate processing, a phase rotation unit generates a repetitive signal of a time length N in which an output signal of the processor is reproduced and arranged, and giving phase rotation to the repetitive signal, and a multiplexer generates, for each transmission antenna, a signal transmitted from the antenna, by multiplexing the
(Continued)

repetitive signals given the phase rotation, and the unit gives different phase rotations to repetitive signals multiplexed to an identical transmission signal.

20 Claims, 16 Drawing Sheets

(51) Int. Cl.
| | |
|---|---|
| H04B 7/08 | (2006.01) |
| H04L 5/00 | (2006.01) |
| H04L 27/26 | (2006.01) |
| H04L 1/06 | (2006.01) |
| H04L 25/03 | (2006.01) |
| H04L 1/00 | (2006.01) |

(52) U.S. Cl.
CPC .......... *H04L 1/0071* (2013.01); *H04L 1/0643* (2013.01); *H04L 1/0668* (2013.01); *H04L 5/0007* (2013.01); *H04L 25/03159* (2013.01); *H04L 27/265* (2013.01); *H04L 27/2617* (2013.01)

(58) Field of Classification Search
CPC ............. H04L 25/03159; H04L 1/0071; H04L 1/0058; H04L 27/2617
See application file for complete search history.

(56) References Cited

U.S. PATENT DOCUMENTS

| | | |
|---|---|---|
| 8,233,467 B2 | 7/2012 | Castelain et al. |
| 2006/0077886 A1 | 4/2006 | Oh et al. |
| 2012/0063530 A1* | 3/2012 | Nakajima .............. H04B 7/068 375/267 |
| 2013/0205184 A1* | 8/2013 | Nishimoto .......... H03M 13/255 714/776 |
| 2014/0016451 A1* | 1/2014 | Muruganathan .... H04L 25/0204 370/210 |

FOREIGN PATENT DOCUMENTS

| | | |
|---|---|---|
| JP | 5027255 B2 | 9/2012 |
| JP | 5106250 B2 | 12/2012 |

OTHER PUBLICATIONS

Jang, Jin-Ho et al., "Cyclic Prefixed Single Carrier Transmission With SFBC Over Mobile Wireless Channels," IEEE Signal Processing Letters, May 2006, vol. 13, No. 5, pp. 261-264.

Li, Ye (Geoffrey) et al., "Transmitter Diversity for OFDM Systems and Its Impact on High-Rate Data Wireless Networks," IEEE Journal on Selected Areas in Communications, Jul. 1999, vol. 17, No. 7, pp. 1233-1243.

Alamouti, Siavash M., "A Simple Transmit Diversity Technique for Wireless Communications," IEEE Journal on Select Areas in Communications, Oct. 1998, vol. 16, No. 8, pp. 1451-1458.

"Tx Diversity in LTE DL," 3GPP TSG RAN WG1 Meeting #48bis, R1-071607, Ericsson, Mar. 26-30, 2007, 14 pages.

Ciochina, Cristina et al., "New PAPR-Preserving Mapping Methods for Single-Carrier FDMA with Space-Frequency Block Codes," IEEE Transactions on Wireless Communications, Oct. 2009, vol. 8, No. 10, pp. 5176-5186.

Tarokh, Vahid et al., "Space-Time Block Codes from Orthogonal Designs," IEEE Transactions on Information Theory, Jul. 1999, vol. 45, No. 5, pp. 1456-1467.

Jafarkhani, Hamid, "A Quasi-Orthogonal Space-Time Block Code," IEEE Transactions on Communications, Jan. 2001, vol. 49, No. 1, pp. 1-4.

\* cited by examiner

| $s_a[t]$ | $s_a[t]$ | $s_a[t]$ | $s_a[t]$ | |
|---|---|---|---|---|
| $-s^*_b[-t]$ | $-s^*_b[-t]$ | $-s^*_b[-t]$ | $-s^*_b[-t]$ | $\times e^{j2\pi t/N}$ |
| $-s^*_c[-t]$ | $-s^*_c[-t]$ | $-s^*_c[-t]$ | $-s^*_c[-t]$ | $\times e^{j4\pi t/N}$ |
| 0 | 0 | 0 | 0 | $\times e^{j6\pi t/N}$ |

$x_2[t]$:

| $s_b[t]$ | $s_b[t]$ | $s_b[t]$ | $s_b[t]$ | |
|---|---|---|---|---|
| $s^*_a[-t]$ | $s^*_a[-t]$ | $s^*_a[-t]$ | $s^*_a[-t]$ | $\times e^{j2\pi t/N}$ |
| 0 | 0 | 0 | 0 | $\times e^{j4\pi t/N}$ |
| $-s^*_c[-t]$ | $-s^*_c[-t]$ | $-s^*_c[-t]$ | $-s^*_c[-t]$ | $\times e^{j6\pi t/N}$ |

$x_3[t]$:

| $s_c[-t]$ | $s_c[-t]$ | $s_c[-t]$ | $s_c[-t]$ | |
|---|---|---|---|---|
| 0 | 0 | 0 | 0 | $\times e^{j2\pi t/N}$ |
| $s^*_a[-t]$ | $s^*_a[-t]$ | $s^*_a[-t]$ | $s^*_a[-t]$ | $\times e^{j4\pi t/N}$ |
| $s^*_b[-t]$ | $s^*_b[-t]$ | $s^*_b[-t]$ | $s^*_b[-t]$ | $\times e^{j6\pi t/N}$ |

$x_4[t]$:

| 0 | 0 | 0 | 0 | |
|---|---|---|---|---|
| $s_c[t]$ | $s_c[t]$ | $s_c[t]$ | $s_c[t]$ | $\times e^{j2\pi t/N}$ |
| $-s_b[-t]$ | $-s_b[-t]$ | $-s_b[-t]$ | $-s_b[-t]$ | $\times e^{j4\pi t/N}$ |
| $s_a[t]$ | $s_a[t]$ | $s_a[t]$ | $s_a[t]$ | $\times e^{j6\pi t/N}$ |

TRANSMISSION DEVICE, RECEPTION DEVICE, COMMUNICATION SYSTEM, TRANSMISSION METHOD AND RECEPTION METHOD

FIELD

The present invention relates to a transmission device to perform transmission diversity transmission, a reception device, a communication system, a transmission method and a reception method.

BACKGROUND

In a communication field, specifically in a wireless communication field, SCBT (single-carrier block transmission) in which DFT (discrete Fourier transform) and IDFT (inverse DFT) are performed on a transmission side or a reception side and a single carrier signal is processed in a block unit is actively considered. The SCBT realizes high frequency utilization efficiency equivalent to that of a multi-carrier transmission system represented by OFDM (orthogonal frequency division multiplexing). Moreover, the SCBT has low peak power and high transmission power efficiency since a base of the SCBT is a single carrier signal. Note that in the following, PAPR (a peak-to-average power ratio) that is a ratio of a peak to average power is an index of a peak power characteristic. Also, the SCBT has multi-path resistance equivalent to that of OFDM since FDE (frequency-domain equalization) is performed on a reception side to thereby compensate for frequency distortion due to a multi-path transmission channel.

The SCBT is also called SC-FDE (single carrier-FDE), SC-FDMA (single carrier-frequency division multiple access), SC-OFDM (single carrier-OFDM), or DFT-Spread OFDM.

On the other hand, in a wireless communication system including a plurality of transmission antennas, called a MISO (a multiple-input single-output) system or a MIMO (multiple-input multiple-output) system, a several transmission diversity methods to improve transmission quality are proposed. In the following, a conventional transmission diversity method that can be applied to SCBT will be described. In order to simplify a description, a transmission diversity method of transmitting one signal stream from two transmission antennas that are a transmission antenna #1 and a transmission antenna #2 will be described as an example in the following description. However, a similar technology is also disclosed in a case where three or more transmission antennas are included.

As a simple transmission diversity method, a delay diversity technology is disclosed in Non Patent Literature 1. In the delay diversity technology disclosed in Non Patent Literature 1, a signal stream is transmitted from a transmission antenna #1 and a signal stream identical to the signal stream transmitted from the transmission antenna #1 is delayed and transmitted from a transmission antenna #2. Also, in Patent Literature 1, a CDD (cyclic delay diversity) technology in which a signal stream transmitted from a transmission antenna #2 is subjected to a cyclic delay in an IDFT block and transmitted is disclosed. When the delay diversity technology or the cyclic delay diversity technology is used, it is observed on a reception side that signal streams equivalently pass through a multi-path transmission channel with a delay. Thus, a multi-path diversity effect is acquired. Also, since a signal transmitted from a transmission antenna #2 is the same as a signal transmitted from a transmission antenna #1 and is only delayed, there is an advantage that transmission power efficiency can be kept without deterioration of a PAPR characteristic of a transmission signal waveform.

In Non Patent Literature 2, an STBC technology using STBC (space-time block code) is disclosed. In the STBC technology disclosed in Non Patent Literature 2, temporally-successive two blocks are a time block #1 and a time block #2. In the time block #1, signal streams are spread to two transmission antennas and are transmitted simultaneously. In the time block #2, the signals transmitted in the time block #1 are switched between the transmission antennas, and complex conjugate and sign inversion of a positive/negative sign with respect to the one transmission antenna only are performed. The above-described signal processing in the transmission means that orthogonal coding is performed in two dimensions of time and space on a transmission side and is generally called Alamouti coding. On a reception side, it is possible to easily perform decoding by performing linear combination of two received time blocks by using transmission channel information. Accordingly, diversity gain for the number of transmission antennas, that is, transmission full diversity is acquired.

In Non Patent Literature 3, unlike the above-described STBC that is orthogonally coded in two dimensions of space and time, an SFBC technology using SFBC (space-frequency block code) that performs similar coding in two dimensions of space and a frequency is disclosed. On the premise of OFDM and on the assumption that a frequency variation in a transmission channel between adjoining two sub-carriers can be ignored, in the SFBC technology, signal switching, complex conjugate, and sign inversion are performed in two transmission antennas between two adjoining sub-carriers in one time block. Accordingly, in the SFBC technology, there is an advantage that transmission full diversity is acquired similarly to the STBC technology and that time variation resistance of a transmission channel is high compared to the STBC technology since the coding is performed in the one time block. This SFBC technology can be applied not only to OFDM but also to the SCBT technology.

In Non Patent Literature 4, with respect to the SFBC technology disclosed in Non Patent Literature 3, an SFBC technology for SCBT with which technology PAPR of a transmission time waveform is not deteriorated at all by successful utilization of a property of discrete Fourier transform is disclosed. Also, in Patent Literature 2, in an SFBC technology similar to that in Non Patent Literature 4, a technology of coding in a time domain is disclosed.

CITATION LIST

Patent Literature

Patent Literature 1: Japanese Patent No. 4988137
Patent Literature 2: Japanese Patent No. 5106250

Non Patent Literature

Non Patent Literature 1: Y. Li, J. C. Chuang, and N. R. Sollenberger, "Transmitter Diversity for OFDM Systems and Its Impact on High-Rate Data Wireless Networks," IEEE J. Sel. Areas Commun., VOL. 17, NO. 7, pp. 1233-1243, JULY 1999.
Non Patent Literature 2: S. M. Alamouti, "A Simple Transmit Diversity Technique for Wireless Communications,"

IEEE J. Sel. Areas Commun., VOL. 16, NO. 8, pp. 1451-1458, OCTOBER 1998.

Non Patent Literature 3: 3GPP, R1-071607, Ericsson, "Tx Diversity in LTE DL," March 2007.

Non Patent Literature 4: C. Ciochina, D. Castelain, D. Mottier, and H. Sari, "New PAPR-Preserving Mapping Methods for Single-Carrier FDMA with Space-Frequency Block Codes," IEEE Trans. Wirel. Commun., VOL. 8, NO. 10, pp. 5176-5186, OCTOBER 2009.

SUMMARY

Technical Problem

However, originally, both of a delay diversity technology and a cyclic delay diversity technology disclosed in Non Patent Literature 1 and Patent Literature 1 are to artificially generate a multi-path causing interference at a reception point. Thus, there is a problem in that acquired diversity gain is small compared to a system of performing spatial coding such as the STBC technology.

Also, the STBC technology described in Non Patent Literature 2 is a technology on the premise that there is no time variation in a transmission channel state between transmission and reception in a transmission period of two successive time blocks and there is a problem in that a transmission characteristic is deteriorated in a case where there is a large time variation due to high-speed movement or the like.

Also, the SFBC technology disclosed in each of Non Patent Literature 3, Non Patent Literature 4, and Patent Literature 2 performs coding between sub-carriers away from each other in a frequency domain and performs coding between sub-carriers away from each other for about a half of a signal band at maximum. Thus, there is a problem in that a transmission characteristic is greatly deteriorated in a case where a frequency variation in a transmission channel cannot be ignored.

Also, the SFBC technology disclosed in Non Patent Literature 3 has an advantage that resistance to a frequency variation in a transmission channel is high since SFBC coding is performed between adjoining sub-carriers. However, since operations of signal switching, complex conjugate and sign inversion are performed for each sub-carrier in a frequency domain, there is a problem in that PAPR of a transmission signal is deteriorated and transmission power efficiency is decreased.

The present invention is provided in view of the forgoing and is to acquire a transmission device, a reception device, a communication system, a transmission method and a reception method that can prevent a decrease in efficiency of transmission power while preventing deterioration of a transmission characteristic even in an environment in which a transmission channel temporally varies at high speed.

Solution to Problem

To solve the above problem and the object, the present invention provide a transmission device comprising: two or more transmission antennas; and a coding unit to perform space frequency block coding of a signal stream of a first time length, wherein the coding unit includes a signal dividing unit to equally divide the signal stream into sub-streams of second time lengths and perform a cyclic shift of one or more sub-streams among the sub-streams in a time length in which a value divided by a primary modulation symbol interval of the sub-streams becomes a non-integer value, a complex signal processing unit to output the sub-streams as they are, as output signals, perform complex signal processing on the sub-streams, the complex signal processing being time-axis inversion processing, complex conjugate processing and sign inversion processing, or the time-axis inversion processing and complex conjugate processing, and output as output signals the sub-streams on which the complex signal processing has been performed, a phase rotation unit to generate a repetitive signal that is a signal of a third time length in which signal arrangement is repeated in a time direction, for each of the output signals output from the complex signal processing unit, and give a phase rotation to the repetitive signal, and a multiplexing unit to generate, for each of the transmission antennas, a transmission signal transmitted from the transmission antenna, by multiplexing the repetitive signals to which the phase rotation has been given, and the phase rotation unit gives different phase rotations to the repetitive signals multiplexed to an identical transmission signal.

Advantageous Effects of Invention

According to the present invention, even in an environment in which a transmission channel temporally varies at high speed, an effect of preventing a decrease in efficiency of transmission power while preventing deterioration of a transmission characteristic is acquired.

BRIEF DESCRIPTION OF DRAWINGS

FIG. 11 is a diagram schematically illustrating an SFBC coding method for four transmission antennas of the first embodiment.

DESCRIPTION OF EMBODIMENTS

In the following, embodiments of a transmission device, a reception device, a communication system, a transmission method, and a reception method according to the present invention will be described in detail with reference to the drawings. Note that this invention is not limited to these embodiments.

First Embodiment

Figure 1:
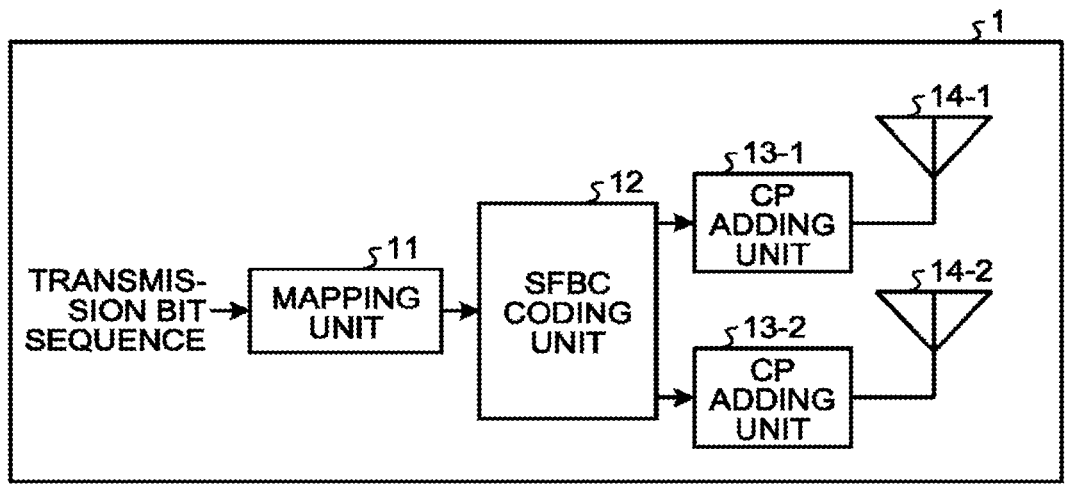
FIG. 1 is a diagram illustrating a configuration example of a transmission device of a first embodiment.

FIG. 1 is a diagram illustrating a configuration example of a transmission device of the first embodiment according to the present invention. As illustrated in FIG. 1, a transmission device 1 of the present embodiment includes a mapping unit 11 that performs primary modulation of a transmission bit sequence, an SFBC coding unit 12 that is a coding unit to perform SFBC coding, which is coding using an SFBC technology, of a signal stream that is a result of the primary modulation, CP adding units 13-1 and 13-2 to add a CP (cyclic prefix) to an SFBC-coded transmission signal output from the SFBC coding unit 12, and transmission antennas 14-1 and 14-2. The CP adding unit 13-1 is connected to the transmission antenna 14-1 and adds CP to a transmission signal transmitted from the transmission antenna 14-1. The CP adding unit 13-2 is connected to the transmission antenna 14-2 and adds CP to a transmission signal transmitted from the transmission antenna 14-2. Here, an example in which there are two transmission antennas is described. In a case where there are three or more transmission antennas, a CP adding unit is included for each transmission antenna and each CP adding unit adds CP to a transmission signal transmitted from a corresponding transmission antenna, that is, a connected transmission antenna. The SFBC coding unit 12 performs SFBC coding corresponding to the number of transmission antennas.

In FIG. 1, a component related to baseband signal processing in the transmission device 1 is illustrated. However, the transmission device 1 may include components that are not illustrated in FIG. 1. For example, the transmission device 1 may include a filter, and an analog unit that performs analog signal processing.

Here, a premise and a definition of words in the following description are described. It is assumed that SFBC coding in the present embodiment is Alamouti coding disclosed in each of Non Patent Literature 2 and 3. Also, in the present embodiment, it is assumed that SCBT is used as a transmission system.

Also, in the present embodiment, a unit of adding a cyclic prefix, that is, CP is called a "block" and a time length of one block excluding CP is N. Note that in the present embodiment, time t indicates time discretized in a unit of a primary modulation symbol interval. That is, t is an integer. A time length N of one block is also an integer. A primary modulation result, that is, a modulation symbol sequence transmitted in one block is called a "signal stream" or is simply called a "stream" and a time length of the signal stream is M. In SFBC in a case of two transmission antennas, that is, SFBC for two transmission antennas, N=M. In Alamouti-type SFBC with four transmission antennas, N=M×(4/3). SFBC coding is performed in a closed manner in one block. In the SFBC coding, a signal stream is equally divided. A signal stream generated by the equal devision is called a "signal sub-stream" or is simply called a "sub-stream." When the number of times of division in a case of equally dividing a signal stream is C, a time length of a sub-stream is $M_{sub}$=M/C. The number of times of division C is C=2 in SFBC for two transmission antennas and is C=3 in SFBC for four transmission antennas.

Next, a whole operation in the transmission device 1 will be described. In the transmission device 1, first, the mapping unit 11 performs mapping of a transmission bit sequence into a PSK (phase shift keying) modulation symbol sequence, a QAM (quadrature amplitude modulation) modulation symbol sequence, or the like, that is, performs primary modulation. Note that the transmission bit sequence may be a bit sequence on which pre-processing such as error correction coding has been performed. Then, the SFBC coding unit 12 performs SFBC coding of a modulation symbol sequence, that is, a signal stream and outputs, as a result of the SFBC coding, transmission signals for the number of transmission antennas. A detail of the SFBC coding of the present embodiment will be described later. The CP adding units 13-1 and 13-2 respectively add CPs to the transmission signals output from the SFBC coding unit 12 and respectively output these signals to the transmission antennas 14-1 and 14-2. The transmission antennas 14-1 and 14-2 transmit the CP-added transmission signals output from the CP adding units 13-1 and 13-2.

Figure 2:
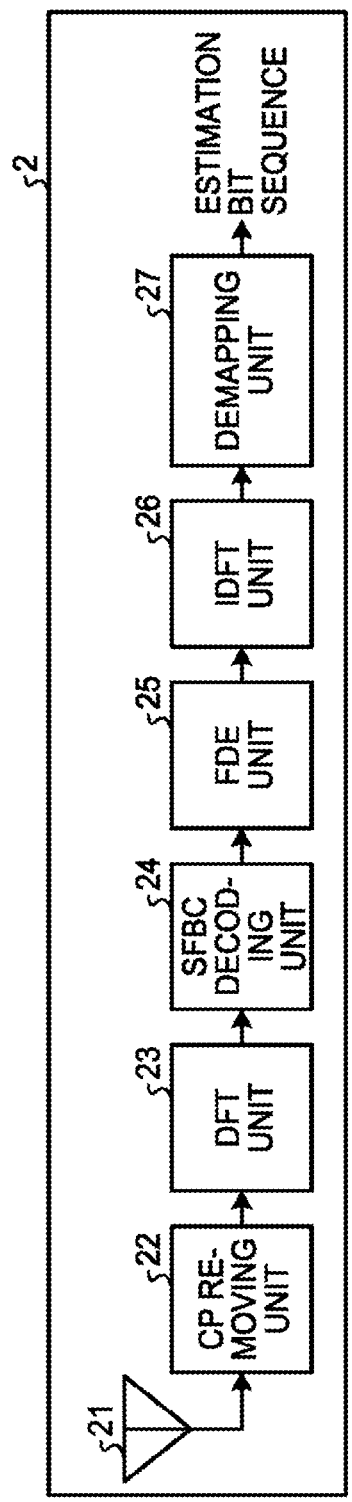
FIG. 2 is a diagram illustrating a configuration example of a reception device of the first embodiment.

FIG. 2 is a diagram illustrating a configuration example of a reception device of the present embodiment. As illustrated in FIG. 2, a reception device 2 of the present embodiment includes a reception antenna 21, a CP removing unit 22 to remove CP from a reception signal received in the reception antenna 21, and a DFT unit 23 that is a discrete Fourier transform unit to transform the CP-removed reception signal into a frequency domain by DFT. The reception device 2 further includes an SFBC decoding unit 24 that is a decoding unit to perform SFBC decoding of the reception signal after DFT, an FDE unit 25 that is a frequency-domain equalization unit to perform FDE, that is, frequency-domain equalization on an SFBC decoding result, an IDFT unit 26 that is an inverse discrete Fourier transform unit to perform IDFT on the signal on which the frequency-domain equalization has been performed, and a demapping unit 27 that calculates an estimation bit sequence by performing demodulation on the signal on which the IDFT has been performed, in response to primary modulation.

The reception device 2 receives a signal transmitted from the above-described transmission device 1. That is, with the transmission device 1, the reception device 2 configures a communication system. In a case where pre-processing such as error correction coding is performed on a transmission bit sequence in the transmission device 1, the reception device 2 may perform decoding processing that corresponds to the pre-processing on a transmission side, such as deinterleaving or error correction decoding, in a subsequent stage to the demapping unit 27. Also, in a case where soft determination error correction decoding is performed in the subsequent stage, the demapping unit 27 may calculate a soft determination value.

Also, although an example in which there is one reception antenna is illustrated in FIG. 2, there may be a plurality of reception antennas. In this case, the SFBC decoding unit 24 or the FDE unit 25 combines a plurality of reception signals received by the plurality of reception antennas.

In FIG. 2, a component related to baseband signal processing in the reception device 2 is illustrated. However, the reception device 2 may include components that are not illustrated in FIG. 2. For example, the reception device 2 may include a filter, and an analog unit that performs analog signal processing. Also, time synchronous processing, frequency synchronous processing, transmission channel estimation and the like are performed in an actual digital circuit in the reception device 2 but illustration thereof is omitted here. In the following embodiments, it is assumed that the time synchronous processing, the frequency synchronous processing, the transmission channel estimation and the like are operated ideally.

Here, before a detail description of the present embodiment, a relationship between a time signal and a frequency signal thereof is described. In the following, when a time signal v[t] and a frequency signal V[f] are a Fourier transform pair, a relationship between the two is expressed in a manner of an expression (1). Note that f indicates a discretized frequency.

$$v[t] \Leftrightarrow V[f] \quad (1)$$

A frequency signal of a signal v[−t] a time axis of which is inverted with respect to v[t], that is, a Fourier transform result has a property that a frequency axis is inverted with respect to V[f] that is a frequency signal of v[t], as expressed in an expression (2).

$$v[-t] \Leftrightarrow V[-f] \quad (2)$$

As expressed in the following expression (3), a frequency signal of complex conjugate v*[t] of v[t] has a property that complex conjugate and a frequency axis are inverted with respect to V[f] that is a frequency signal of v[t].

$$v*[t] \Leftrightarrow V*[-f] \quad (3)$$

When a signal to which a phase rotation in proportional to time with respect to a time signal g[t] is given is v[t], a frequency signal of v[t] is that which is generated by performing frequency shift on a frequency signal G[f] of g[t], as expressed in an expression (4). Δf indicates a frequency shift amount.

$$v[t]=g[t]\times\exp(-j2\pi\Delta ft) \Leftrightarrow V[f]=G[f+\Delta f] \quad (4)$$

As expressed in an expression (5), in a frequency signal V[f] of the signal v[t] generated by shifting time of g[t] by Δt, a phase rotation in proportional to a frequency with respect to the frequency signal G[f] of g[t] occurs.

$$v[t]=g[t+\Delta t] \Leftrightarrow V[f]=G[f]\times\exp(j2\pi\Delta t) \quad (5)$$

It is known that a frequency signal of a repetitive time signal becomes a comb-shaped spectrum. For example, a signal of a time length N in which signal a signal g[t] (t=0, 1, (N/2)−1) of a time length N/2 is repeated twice, that is, reproduced and arranged in a temporally cascade manner is v[t] (t=0, 1, . . . , N−1). Here, when a frequency signal in which N/2-length DFT is applied with respect to g[t] is G[f] (f=0, 1, . . . , (N/2)−1) and k is an integer, a DFT result of v[t] becomes V[k]=G[f] in a case where k=2f and becomes V[k]=0 in a case where k=2f+1. When this is expressed in an expression, the following expression (6) is acquired with mod as a remainder operator.

$$v[t]=g[t \bmod(N/2)](t=0,\ldots,N-1) \Leftrightarrow V[2f]=G[f], V[2f+1]=0 (f=0,\ldots,(N/2)-1) \quad (6)$$

In a case where a property expressed by the above expression (6) is generalized, when L is a positive number, a DFT result of a signal v[t] (t=0, 1, . . . , N−1) of a time length N in which signal a signal g[t] (t=0, 1, . . . , (N/L)−1) of a time length N/L is repeated L times in a cascade manner becomes a comb-shaped spectrum as expressed in the following expression (7) with k as an integer.

$$v[t]=g[t \bmod(N/L)](t=0,\ldots,N-1) \Leftrightarrow V[k]=G[f]$$
$$(\text{when } k=Lf), V[k]=0 \text{ (when } k\neq Lf) \quad (7)$$

Figure 3:
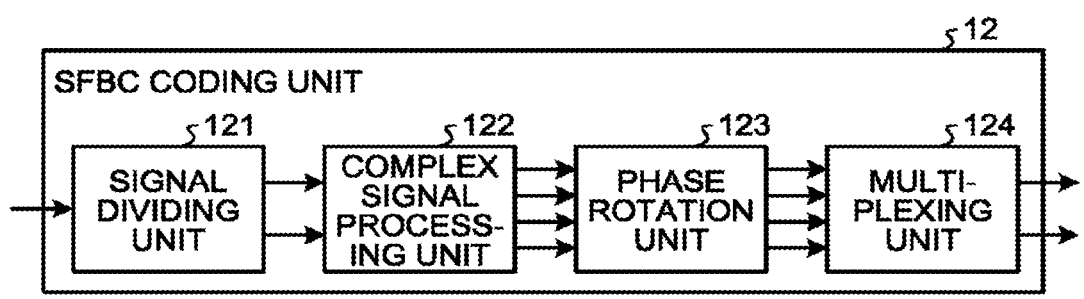
FIG. 3 is a diagram illustrating a configuration example of an SFBC coding unit of the first embodiment.

On the premise of the above, SFBC coding of the present embodiment will be described. FIG. 3 is a diagram illustrating a configuration example of the SFBC coding unit 12 of the first embodiment. The SFBC coding unit 12 includes a signal dividing unit 121 that divides an input signal stream, a complex signal processing unit 122 that performs time-axis inversion processing, complex conjugate processing and sign inversion processing, or time-axis inversion processing and complex conjugate processing on the divided signal or that outputs the divided signal as it is, a phase rotation unit 123 that reproduces and arranges the signal output from the complex signal processing unit 122 or that gives a phase rotation to the signal output from the complex signal processing unit 122, and a multiplexing unit 124 that adds signals processed by the phase rotation unit 123.

Figure 4:
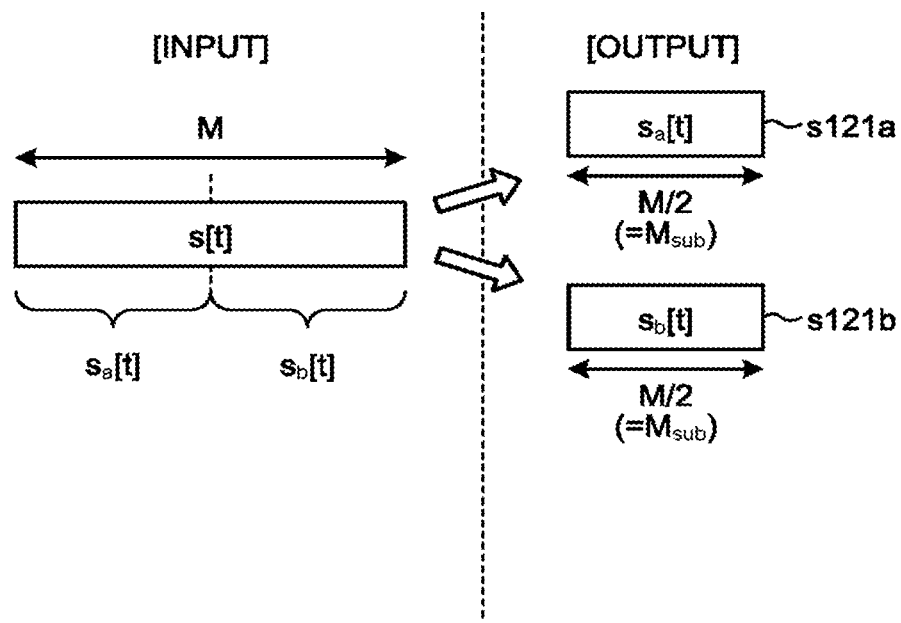
FIG. 4 is a diagram illustrating processing contents of a signal dividing unit of the first embodiment.

FIG. 4 is a diagram illustrating processing contents of the signal dividing unit 121. The signal dividing unit 121 equally divides a signal stream s[t] of a time length M that is input from the mapping unit 11. Here, since a description is made with SFBC for two transmission antennas as an example, the number of times of division in the equal division is C=2. Thus, the signal stream s[t] is equally divided into two that are a first half and a second half, and results of the equal division are sa[t] and sb[t] respectively. Also, sa[t] and sb[t] are respectively referred to as a first sub-stream and a second sub-stream. The signal dividing unit 121 outputs the signal sub-streams sa[t] and sb[t] in parallel. A time length Msub of each of the equally-divided signal sub-streams sa[t] and sb[t] is $M_{sub}$=M/C=M/2.

Figure 5:
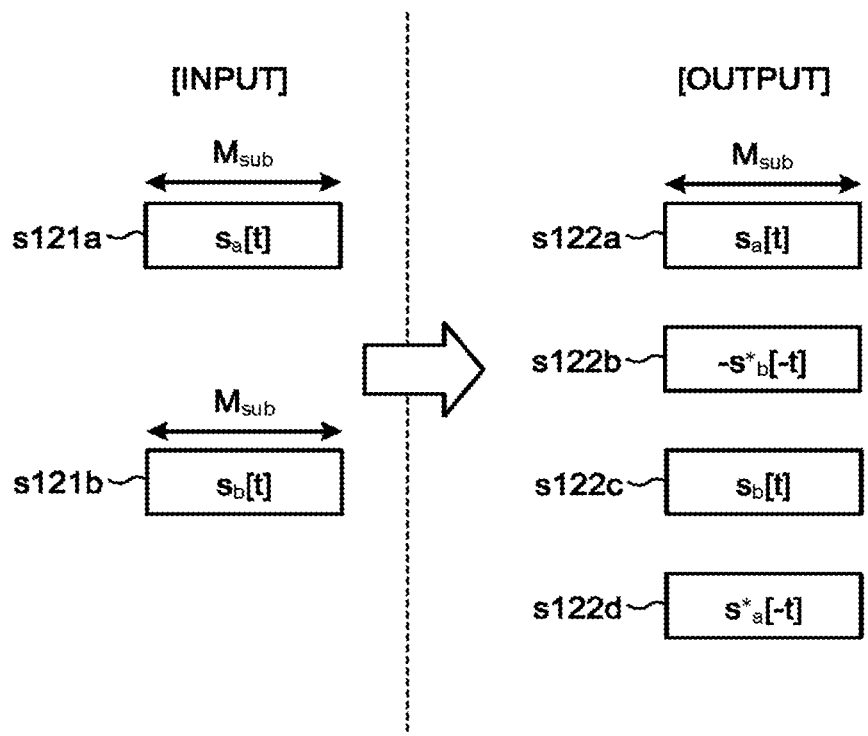
FIG. 5 is a diagram illustrating processing contents of a complex signal processing unit of the first embodiment.

FIG. 5 is a diagram illustrating processing contents of the complex signal processing unit 122. In FIG. 5, input signals into the complex signal processing unit 122 are illustrated as signals s121a and s121b and output signals of the complex signal processing unit 122 are illustrated as signals s122a, s122b, s122c and s122d. The signal s121a is a signal sub-stream $s_a$[t] output from the signal dividing unit 121 and the signal s121b is a signal sub-stream $s_b$[t] output from the signal dividing unit 121. The complex signal processing unit 122 respectively outputs, as signals s122a and s122c, the signal s121a, that is, $s_a$[t] and the signal s121b, that is, $s_b$[t] as they are. Also, the complex signal processing unit 122 performs time-axis inversion, complex conjugate, and sign inversion on the signal s121b and outputs a result of the processing, that is, −$s^*_b$[−t] as a signal s122b. Moreover, the complex signal processing unit 122 performs time-axis inversion and complex conjugate on the signal s121a and outputs a result of the processing, that is, $s^*_a$[−t] as a signal s122d. That is, the complex signal processing unit 122 generates and outputs −$s^*_b$[−t] and $s^*_a$[−t], and outputs $s_a$[t] and $s_b$[t] as they are.

Figure 6:
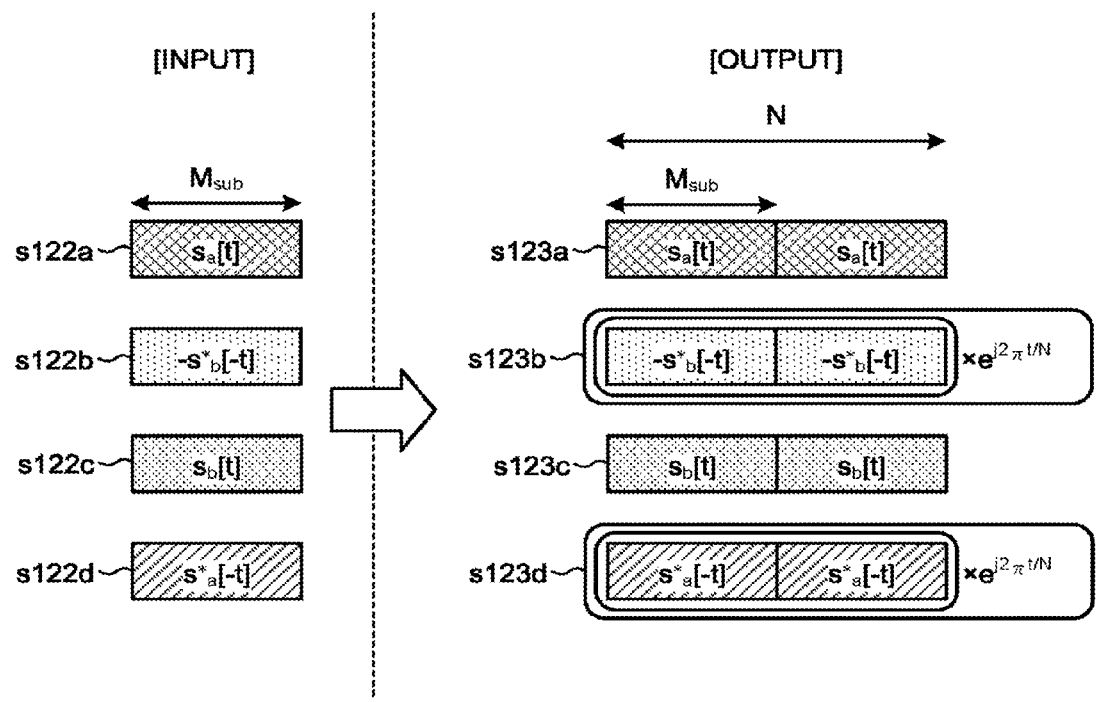
FIG. 6 is a diagram illustrating processing contents of a phase rotation unit of the first embodiment.

FIG. 6 is a diagram illustrating processing contents of the phase rotation unit 123. To the phase rotation unit 123, the signals s122a, s122b, s122c and s122d output from the complex signal processing unit 122 are input. As illustrated in FIG. 6, the phase rotation unit 123 generates signals of a time length N in which the signals s122a, s122b, s122c and s122d are respectively reproduced and arranged, that is, repetitive signals of a time length N in each of which two sub-streams of the same contents are arranged, and the time length N is the same as a time length N of a signal stream. The phase rotation unit 123 outputs a signal of the time length N in which the signal s122a is reproduced and arranged, as it is as a signal s123a that is a first repetitive signal and outputs a signal of the time length N in which the signal s122c is reproduced and arranged, as it is as a signal s123c that is a second repetitive signal. Note that outputting an input signal as it is corresponds to giving a phase rotation with a phase rotation amount being 0. Also, the phase rotation unit 123 performs a phase rotation on a third repetitive signal that is a repetitive signal of the time length N in which the signal s122b is reproduced and arranged, by multiplication by exp(j2πt/N) for the time length N and outputs the phase-rotated signal as a signal s123b. The phase rotation unit 123 performs a phase rotation on a fourth repetitive signal that is a repetitive signal of the time length N in which the signal s122d is reproduced and arranged, by multiplication by exp(j2πt/N) for the time length N and outputs the phase-rotated signal as a signal s123d.

Figure 7:
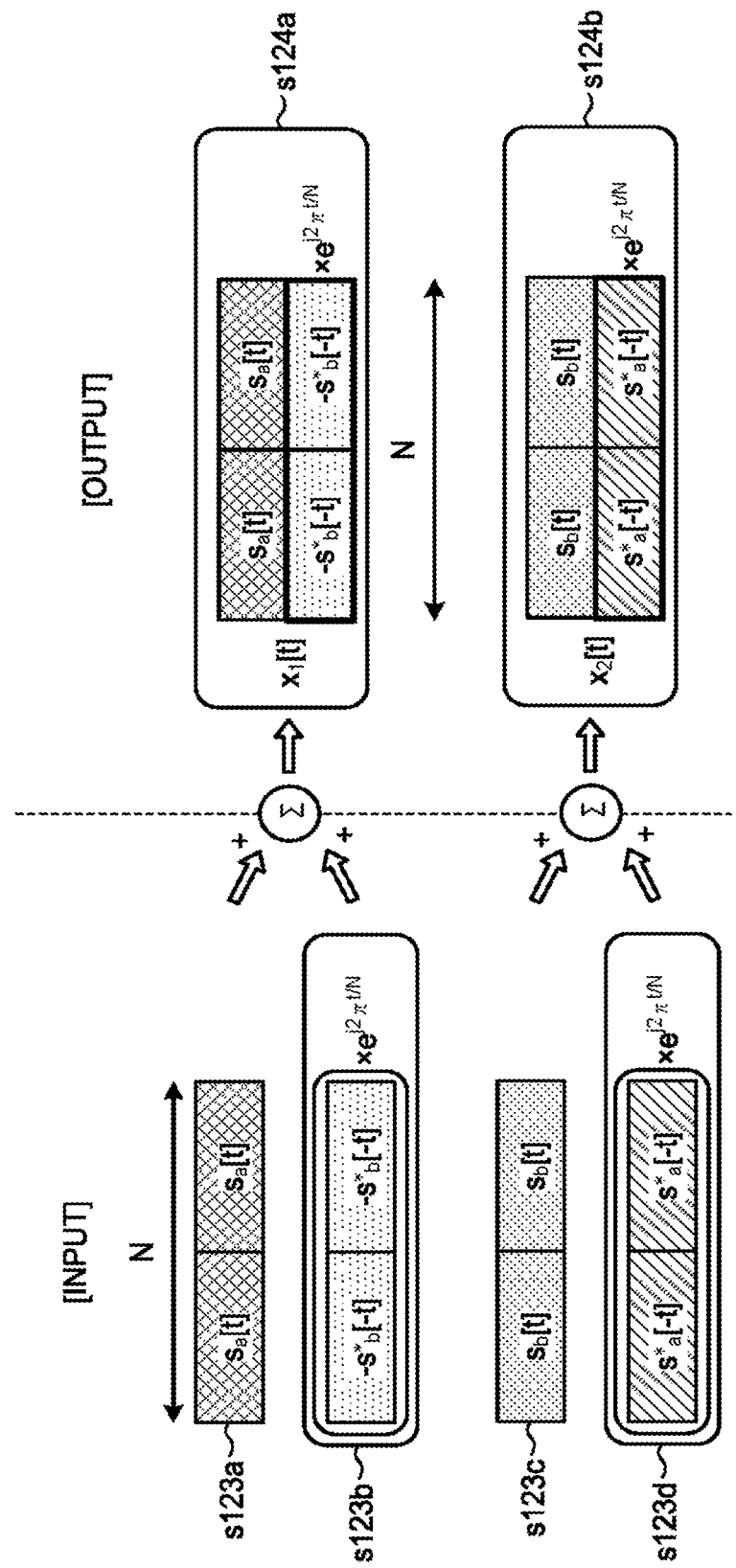
FIG. 7 is a diagram illustrating processing contents of a multiplexing unit of the first embodiment.

FIG. 7 is a diagram illustrating processing contents of the multiplexing unit 124. The multiplexing unit 124 generates a signal s124a that is a first transmission signal by adding, that is, multiplexing the signals s123a and s123b and outputs the signal s124a to the CP adding units 13-1. Also, the multiplexing unit 124 generates a signal s124b that is a second transmission signal by adding, that is, multiplexing the signals s123c and s123d and outputs the signal s124b to the CP adding units 13-2. In the following, the signal s124a is also expressed as x1[t] and the signal s124b is also expressed as x2[t]. x1[t] corresponds to a transmission signal transmitted from the transmission antenna 14-1 that is a first transmission antenna and $x_2[t]$ corresponds to a transmission signal transmitted from the transmission antenna 14-2 that is a second transmission antenna.

The transmission signals x1[t] and x2[t] that are acquired by the series of processing in the signal dividing unit 121, the complex signal processing unit 122, the phase rotation unit 123, and the multiplexing unit 124 can be expressed by next expressions (8) and (9) using the signals sa[t] and sb[t] after the division by the signal dividing unit 121. Note that as described above, in SFBC for two transmission antennas, M=N and Msub=N/2. Note that the time length M is also referred to as a first time length, the time length $M_{sub}$ is also referred to as a second time length, and the time length N is also referred to as a third time length.

$$x_1[t]=s_a[t \bmod M_{sub}]-s^*_b[(N-t) \bmod M_{sub}]\times \exp(j2\pi t/N) \ (t=0,\ldots,N-1) \quad (8)$$

$$x_2[t]=s_b[t \bmod M_{sub}]+s^*_a[(N-t) \bmod M_{sub}]\times \exp(j2\pi t/N) \ (t=0,\ldots,N-1) \quad (9)$$

As it is understood from the expressions (8) and (9), and FIG. 7, in this manner, the phase rotation unit 123 gives a phase rotation to each signal in such a manner that a rotation amount of the phase rotation varies between signals added in the multiplexing unit 124.

Figure 8:
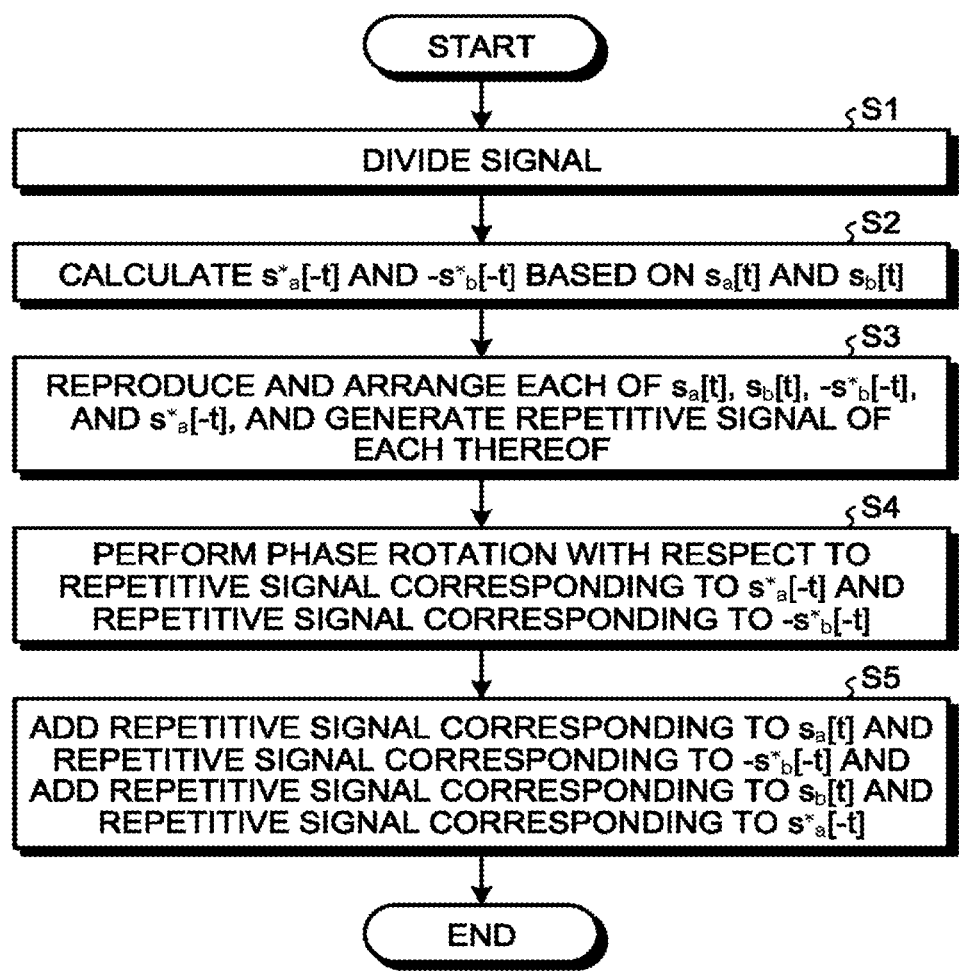
FIG. 8 is a flowchart illustrating an example of a processing procedure in the SFBC coding unit of the first embodiment.

FIG. 8 is a flowchart illustrating an example of a processing procedure in the SFBC coding unit 12 of the present embodiment. As illustrated in FIG. 8, the SFBC coding unit 12 equally divides a signal stream s[t] of the time length M (step S1). More specifically, the signal dividing unit 121 equally divides the signal stream s[t] of the time length M that is input from the mapping unit 11. Then, the SFBC coding unit 12 calculates $s^*_a[-t]$ and $-s^*_b[-t]$ based on $s_a[t]$ and $s_b[t]$ (step S2). More specifically, the complex signal processing unit 122 generates $s_a^*[-t]$ by performing time-axis inversion and complex conjugate on $s_a[t]$ and generates $-s^*_b[-t]$ by performing time-axis inversion, complex conjugate and sign inversion on $s_b[t]$. Then, as described above, the complex signal processing unit 122 outputs $s_a[t]$, $s_b[t]$, $s^*_a[-t]$, and $-s^*_b[-t]$ to the phase rotation unit 123.

Then, the phase rotation unit 123 of the SFBC coding unit 12 reproduces and arranges each of $s_a[t]$, $s_b[t]$, $s^*_a[-t]$ and $-s^*_b[-t]$, and generates repetitive signals thereof (step S3). More specifically, the signals of the time length N in which signals $s_a[t]$, $s_b[t]$, $s^*_a[-t]$, and $-s^*_b[-t]$ are respectively reproduced and arranged are generated, that is, the repetitive signals each of which has the two sub-streams of the same contents arranged and the same length N as the time length N of a signal stream are generated. Then, the phase rotation unit 123 of the SFBC coding unit 12 performs phase rotation processing on each of a repetitive signal corresponding to $s^*_a[-t]$ and a repetitive signal corresponding to $-s^*_b[-t]$ (step S4).

Then, the multiplexing unit 124 of the SFBC coding unit 12 adds a repetitive signal corresponding to $s_a[t]$ and the repetitive signal corresponding to $-s^*_b[-t]$, and adds a repetitive signal corresponding to $s_b[t]$ and the repetitive signal corresponding to $s^*_a[-t]$ (step S5). Signals $x_1[t]$ and $x_2[t]$ acquired by the addition are respectively output to the CP adding units 13-1 and 13-2.

Figure 9:
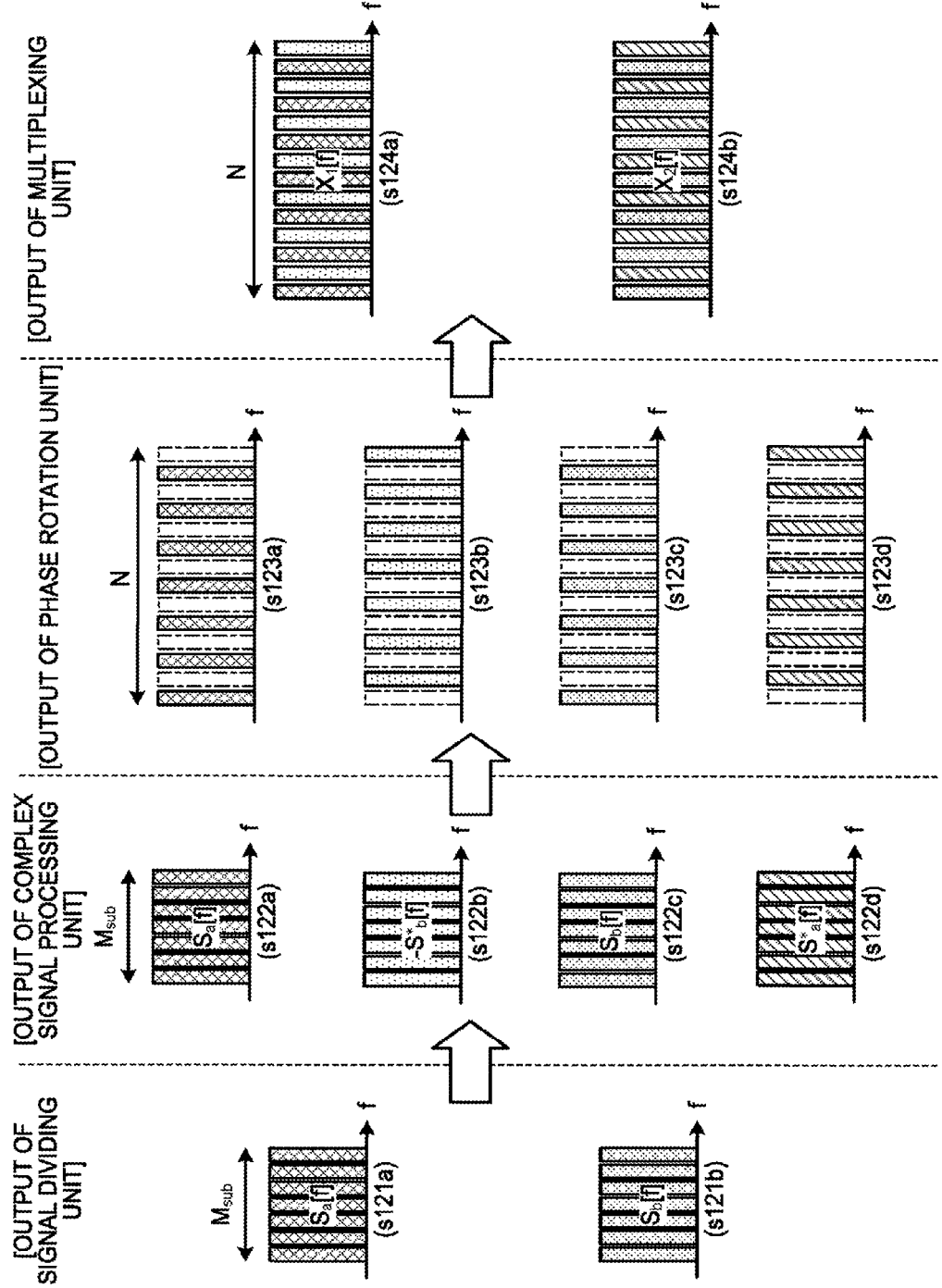
FIG. 9 is a diagram schematically illustrating a frequency spectrum of an output signal of each of the signal dividing unit, the complex signal processing unit, the phase rotation unit, and the multiplexing unit of the first embodiment.

Here, how the series of processing in the SFBC coding unit 12 is observed as a frequency spectrum will be described. FIG. 9 is a diagram schematically illustrating a frequency spectrum of an output signal of each of the signal dividing unit 121, the complex signal processing unit 122, the phase rotation unit 123, and the multiplexing unit 124. Here, frequency signals that are results of performing Msub-point DFT on the signal sub-streams sa[t] and sb[t] of the time lengths Msub are Sa[f] and Sb[f] respectively and frequency signals that are results of performing N-point DFT on x1[t] and x2[t] that are output signals of the time length N from the multiplexing unit 124 are X1[f] and $X_2[f]$ respectively. s121a or the like illustrated under each frequency spectrum in FIG. 9 indicates a time signal corresponding to the spectrum.

Frequency spectrums of output signals output from the signal dividing unit 121 have the time lengths Msub, and are results of performing Msub-point DFT on the signal sub-streams sa[t] and sb[t], that is, Sa[f] and $S_b[f]$, as illustrated in FIG. 8.

Among frequency spectrums of the output signals output from the complex signal processing unit 122, frequency spectrums corresponding to the signals s122a and s122c are $S_a[f]$ and $S_b[f]$ respectively. On the other hand, among frequency spectrums of the output signals output from the complex signal processing unit 122, a frequency spectrum corresponding to the signal s122b becomes $-S^*_b[f]$ according to the properties expressed by the above expressions (2) and (3). Similarly, a frequency spectrum corresponding to the signal s122d becomes $S^*_a[f]$ according to the properties expressed by the above expressions (2) and (3).

Since an output signal from the complex signal processing unit 122 is repeated twice in a cascade manner in each of frequency spectrums respectively corresponding to the signals s123a and s123c among frequency spectrums of the output signals output from the phase rotation unit 123, the frequency spectrum becomes a comb-shaped spectrum according to the properties expressed by the above expressions (6) and (7). Moreover, since repetition is performed twice in a cascade manner and a phase rotation of exp(j2πt/N) is given for the time length N in a time domain with respect to each of the signals s123b and s123d, a spectrum becomes a comb-shaped spectrum a frequency of which is shifted by one frequency interval in a frequency domain. In the following, a description will be made on the assumption that one interval of a discrete frequency, that is, a frequency interval is one sub-carrier.

A frequency spectrum corresponding to the signal s124a among output signals output from the multiplexing unit 124, that is, X1[f] is the frequency spectrum of the signal s123a and the frequency spectrum of the signal s123b added to each other. A frequency spectrum corresponding to the signal s124b, that is, X$_2$[f] is the frequency spectrum of the signal s123c and the frequency spectrum of the signal s123d added to each other. Since a frequency of the signal s123b is shifted by one sub-carrier from that of the signal s123a, the signal s123b is orthogonal to s123a and is multiplexed without interference. Similarly, the signals s123c and s123d are orthogonal to each other and are multiplexed without interference.

Figure 10:
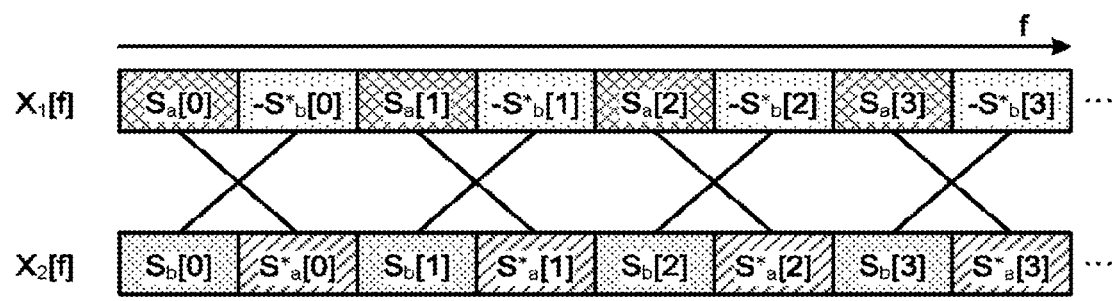
FIG. 10 is a diagram illustrating a relationship between frequency signals of transmission signals transmitted from transmission antennas of the first embodiment.

FIG. 10 is a diagram illustrating a relationship between a frequency signal X1[f] of x1[t] transmitted from the transmission antenna 14-1 and a frequency signal X2[f] of x2[t] transmitted from the transmission antenna 14-2. The frequency signals X1[f] and X$_2$[f] of the transmission signals from the transmission antennas 14-1 and 14-2 are in a relationship of being SFBC-coded for each two successive sub-carriers. That is, expression can be made with the following expressions (10) and (11).

$$X1[2f]=S_a[f], X2[2f]=S_b[f] \quad (10)$$

$$X_1[2f+1]=-S^*_b[f], X_2[2f+1]=S^*_a[f] \quad (11)$$

In such a manner, S$_a$[f] is mapped, that is, assigned to a position of an even number in X$_1$[f], that is, a sub-carrier of an even number, $-S^*_b$[f] is mapped to a position of an odd number in X$_1$[f], that is, a sub-carrier of an odd number, S$_b$[f] is mapped to a position of an even number in X$_2$[f], and $S^*_a$[f] is mapped to a position of an odd number in X$_2$[f].

By the above signal processing in the SFBC coding unit 12, as expressed in FIG. 10 and the expressions (10) and (11), SFBC between adjoining sub-carriers can be realized unlike the conventional SFBC technologies disclosed in Non Patent Literature 4 and Patent Literature 2. Thus, it is possible to suppress deterioration in a transmission characteristic. Moreover, the processing in the SFBC coding unit 12 is performed only by time-domain processing of signal equal division, time-axis inversion, complex conjugate, sign inversion, reproduction, phase rotation and combination, with respect to temporally-successive signal streams. Compared to the conventional technology in Non Patent Literature 3, great PAPR deterioration in a transmission signal waveform transmitted from the transmission antennas 14-1 and 14-2 does not occur. Also, since whole SFBC coding processing is performed in a time domain, a device configuration can be simple compared to the conventional technology in Non Patent Literature 3.

Next, decoding processing in the SFBC decoding unit 24 of the reception device 2 in the first embodiment will be described. In the present embodiment, as expressed in the expressions (10) and (11), the transmission device 1 transmits an Alamouti-coded transmission signal. Thus, to the reception device 2, the conventional SFBC decoding method disclosed, for example, in Non Patent Literature 2, 3, or 4 can be applied. Here, for simplification of a description, as illustrated in FIG. 2, an example in which there is one reception antenna 21 will be described. Note that as described above, to the SFBC decoding unit 24, a frequency-domain signal that is a CP-removed reception signal transformed into a frequency domain by the DFT unit 23 is input. Also, transmission channel estimation is performed by a transmission channel estimation unit that is not illustrated in FIG. 2 and a result of the estimation of a transmission channel is input into the SFBC decoding unit 24.

When a complex transmission function of a transmission channel between the transmission antenna 14-1 and the reception antenna 21 is H$_1$[f] and a complex transmission function of a transmission channel between the transmission antenna 14-2 and the reception antenna 21 is H$_2$[f], frequency signals R[2f] and R[2f+1] of reception signals at frequencies 2f and 2f+1 are expressed by next expressions (12) and (13). Note that N[f] is a noise component an average value of which is 0 and dispersion of which is $\sigma^2$ at a frequency f.

$$R[2f]=H1[2f]X1[2f]+H2[2f]X2[2f]+N[2f]=H1[2f]Sa[f]+H2[2f]S_b[f]+N[2f] \quad (12)$$

$$R[2f+1]=H_1[2f+1]X_1[2f+1]+H_2[2f+1]X_2[2f+1]+N[2f+1]=H_1[2f+1](-S^*_b[f])+H_2[2f+1]S^*_a[f]+N[2f+1] \quad (13)$$

SFBC decoding with respect to a transmitted signal sub-stream is processing in a frequency domain expressed in next expressions (14) and (15). By the following expressions (14) and (15), decoding signal sub-streams S'a[f] and S'b[f] that are decoding results can be acquired. In the following, where appropriate, SFBC decoding expressed in the expression (14) is called S'a[f] decoding and SFBC decoding expressed in the expression (15) is called S'$_b$[f] decoding.

$$S'_a[f]=H^*_1[2f]R[2f]+H_2[2f+1]R^*[2f+1]=(|H1[2f]|^2+|H2[2f+1]|^2) \times S_a[f]+(H^*_1[2f]H_2[2f]-H^*_1[2f+1]H_2[2f+1]) \times S_b[f]+N_a[f] \quad (14)$$

$$S'_b[f]=H^*_2[2f]R[2f]-H_1[2f+1]R^*[2f+1]=(|H2[2f]|^2+|H1[2f+1]|^2) \times S_b[f]+(H_1[2f]H^*_2[2f]-H_1[2f+1]H^*_2[2f+1]) \times S_a[f]+N_b[f] \quad (15)$$

Here, in the above expression (14), N$_a$[f] is an equivalent noise component in the S'a[f] decoding, an average value thereof being 0 and dispersion thereof being $(|H_1[2f]|^2+|H_2[2f+1]|^2)\sigma^2$. Also, in the above expression (15), N$_b$[f] is an equivalent noise component in the S'$_b$[f] decoding, an average value thereof being 0 and a dispersion value thereof being $(|H_2[2f]|^2+|H_1[2f+1]|^2)\sigma^2$.

As expressed in the expressions (14) and (15), the SFBC decoding unit 24 calculates S'a[f] and S'b[f] on the basis of the complex transmission functions H1[f] and H$_2$[f] of the transmission channels that are input as results of estimation of transmission channels, and a frequency signal that is a reception signal transformed into a frequency domain.

As it is understood from the expression (14), a coefficient of an intended Sa[f] component in the S'a[f] decoding is a maximum ratio combination of transmission channel gain of the two transmission antennas 14-1 and 14-2, and transmission diversity is acquired. Also, a coefficient of an Sb[f] component becomes substantially 0 in a case where frequency selectivity of a transmission channel can be ignored, and an interference component is removed from a decoding result. A coefficient of an intended Sb[f] component also becomes a maximum ratio combination in the expression (15) and a coefficient of an S$_a$[f] component that causes interference becomes substantially 0 in a case where frequency selectivity of a transmission channel can be ignored. Thus, the SFBC decoding can be realized by the expression (14) and the expression (15). As described above, this SFBC decoding is the technology disclosed, for example, in Non Patent Literature 2, 3, or 4.

Next, processing in the FDE unit 25 of the present embodiment will be described. As described above, S'a[f] and S'b[f] for the number of sub-carriers Msub, that is, for f=0, 1, . . . , and Msub−1 are acquired by the SFBC decoding unit 24 in a preceding stage of the FDE unit 25. Here, FDE of S'a[f] will be described. As described later, FDE of S'$_b$[f] is similar.

According to the expression (14), the coefficient of the intended S$_a$[f] component included in S'$_a$[f], that is, an equivalent transmission channel value after the SFBC decoding is |H$_1$[2f] |$^2$+|H$_2$[2f+1] |$^2$. Here, an equivalent transmission channel value G$_a$[f] is a value defined in the following expression (16).

$$G_a[f]=|H1[2f]|^2+|H2[2f+1]|^2 \quad (16)$$

As described above, since dispersion of the equivalent noise component included in S'$_a$[f] is G$_a$[f]σ$^2$, dispersion of a noise component varies depending on a frequency f. Thus, in order to make an influence of an equivalent noise component constant regardless of a frequency, as expressed in the following expression (17), normalization is performed by division of the SFBC-decoded signal S'$_a$[f] by √(G$_a$[f]) and a result of the division is set as Y$_a$[f]. Accordingly, dispersion of an equivalent noise component included in Y$_a$[f] becomes σ$^2$ and a square root of an equivalent transmission channel value becomes √(G$_a$ [f]).

$$Ya[f]=S'a[f]/\sqrt{(G_a[f])} \quad (17)$$

The FDE unit 25 performs the processing expressed in the above expression (17) with respect to all sub-carriers, that is, all kinds of f in f=0, 1, . . . , Msub−1 and applies FDE to Ya[f] of f=0, 1, . . . , Msub−1. As FDE, for example, FDE based on a minimum mean square error (MMSE), that is, MMSE-FDE can be applied. MMSE-FDE weight Wa[f] with respect to Y$_a$[f] at a frequency f is calculated by the following expression (18).

$$W_a[f]=\sqrt{(G_a[f])}/(G_a[f]+\sigma^2) \quad (18)$$

The FDE unit 25 calculates the MMSE-FDE weight by the expression (18) with respect to all sub-carriers and multiplies Ya[f] thereby. Subsequently, the IDFT unit 26 performs Msub-point IDFT with respect to Ya[f] multiplied by the MMSE-FDE weight and acquires ya[t] that is an estimation signal sub-stream for s$_a$[t].

With respect to S'$_b$[f], a coefficient of an intended S$_b$[f] component is similarly set as G$_b$[f] as expressed in expressions (19) and (20). Also, S'$_b$[f] that is divided by √(G$_b$[f]) and normalized is set as Y$_b$[f]. Accordingly, dispersion of an equivalent noise component included in Y$_b$[f] becomes σ$^2$ and a square root of an equivalent transmission channel value becomes √(G$_b$[f]).

$$G_b[f]=|H2[2f]|^2+|H1[2f+1]|^2 \quad (19)$$

$$Yb[f]=S'_b[f]/\sqrt{(Gb[f])} \quad (20)$$

Similarly to the expression (18), MMSE-FDE weight Wb[f] is calculated with respect to all sub-carriers and Yb[f] is multiplied thereby. Subsequently, the IDFT unit 26 performs Msub-point IDFT on Yb[f] multiplied by the MMSE-FDE weight and acquires yb[t] that is an estimation signal sub-stream for s$_b$[t].

In the above, an SFBC coding method and decoding method, and an FDE method have been described with respect to SFBC for two transmission antennas. However, the present invention can be applied not only to SFBC for two transmission antennas but also to arbitrary SFBC that realizes coding by complex conjugate and sign inversion of a signal. As an example other than the case of SFBC for two transmission antennas, an SFBC coding method and decoding method in SFBC for four transmission antennas will be briefly described focusing on a difference from the case for two transmission antennas. Similarly to the transmission device 1 in FIG. 1, a transmission device corresponding to SFBC for four transmission antennas includes a mapping unit 11 and an SFBC coding unit 12. However, the SFBC coding unit 12 performs SFBC coding for four transmission antennas, as is discussed below. Also, this transmission device includes four transmission antennas and four CP adding units.

FIG. 11 is a diagram schematically illustrating an SFBC coding method for four transmission antennas. In SFBC using four transmission antennas, a signal stream of a time length M is equally divided into three. That is, the number of times of division C=3. A time length of signal sub-streams after the equal division is set as Msub. The signal sub-streams of the time lengths Msub are set as sa[t], sb[t], and sc[t]. In SFBC using four transmission antennas, N=4 Msub. The four transmission antennas are set as transmission antennas #1, #2, #3, and #4 and signals transmitted from the transmission antennas #1, #2, #3, and #4 are respectively set as x1 [t], x2 [t], x3 [t], and x4[t]. x1 [t], x2 [t], x3 [t], and x4 [t] can be expressed by the following expressions (21) to (24) using sa[t], sb[t], and s$_c$[t].

$$x1[t] = sa[t \bmod M_{sub}] - s_b^*[(N-t) \bmod M_{sub}] \times \exp(j2\pi t/N) - \\ s_c^*[(N-t) \bmod M_{sub}] \times \exp(j4\pi t/N) + 0 \times \exp(j6\pi t/N) \quad (21)$$

$$x2[t] = sb[t \bmod M_{sub}] + s_a^*[(N-t) \bmod M_{sub}] \times \exp(j2\pi t/N) + \\ 0 \times \exp(j4\pi t/N) - s_c^*[(N-t) \bmod M_{sub}] \times \exp(j6\pi t/N) \quad (22)$$

$$x3[t] = sc[t \bmod M_{sub}] + 0 \times \exp(j2\pi t/N) + \\ s_a^*[(N-t) \bmod M_{sub}] \times \exp(j4\pi t/N) + \\ s_b^*[(N-t) \bmod M_{sub}] \times \exp(j6\pi t/N) \quad (23)$$

$$x4[t] = 0 + sc[t \bmod M_{sub}] \times \exp(j2\pi t/N) - \\ sb[t \bmod M_{sub}] \times \exp(j4\pi t/N) + sa[t \bmod M_{sub}] \times \exp(j6\pi t/N) \quad (24)$$

As it is understood from the expressions (21) to (24), a phase rotation unit 123 gives different phase rotation amounts to signals multiplexed to an identical signal. In a case of four transmission antennas, four kinds of phase rotations that are 0, exp(j2πt/N), exp(j4πt/N), and exp(j6πt/N) are used. For example, a phase rotation amount of s$_a$[t] multiplexed as x$_1$[t] is 0, a phase rotation of −s*$_b$[−t] is exp(j2πt/N), and a phase rotation amount of −s*$_c$[−t] is exp(j4πt/N). In this manner, by changing amounts of phase rotation in a unit of one cycle of a time length N, it is possible to perform shifting for each one sub-carrier in a frequency domain. The phase rotations exp(j4πt/N) and exp(j6πt/N) respectively correspond to phase rotations in ½ cycles of the cycle of the time length N and ⅓ cycles thereof. As described later, in order to perform SFBC coding between adjoining sub-carriers, that is, in order to shift a frequency by each one sub-carrier in a frequency space, the phase rotation unit 123 gives a phase rotation with one over an integer of the time length N as a cycle.

When frequency signals of sa[t], sb[t], and sc[t] to which Msub-point DFT has been applied are respectively set as Sa[f], Sb[f], and Sc[f] and frequency signals in application of N-point DFT of signals x1 [t], x2 [t], x3[t], and x4[t] transmitted from the transmission antennas are respectively set as X1 [f], X2 [f], X3[f], and X$_4$[f], the following expressions (25) to (28) are established in a frequency domain according to the expressions (21) to (24). This is similar, for example, to coding disclosed in V. Tarokh, H. Jafarkhani, and A. R. Calderbank, "Space-Time Block Codes from Orthogonal Designs," IEEE Trans. Inform. Theory, vol. 45, no. 5, pp. 1456-1467, July 1999.

$$X1[4f]=S_a[f], X2[4f]=S_b[f], X3[4f]=S_c[f], X_4[4f]=0 \quad (25)$$

$$X_1[4f+1]=-S^*_b[f], X_2[4f+1]=S^*_a[f], X_3[4f+1]=0, X4[4f+1]=S_c[f] \quad (26)$$

$$X_1[4f+2]=-S^*_c[f], X_2[4f+2]=0, X_3[4f+2]=S^*_a[f], X4[4f+2]=-S_b[f] \quad (27)$$

$$X_1[4f+3]=0, X_2[4f+3]=-S^*_c[f], X_3[4f+3]=1S^*_b[f]X4[4f+3]=S_a[f] \quad (28)$$

In this manner, with respect to X1 [f], X2[f], X3[f], and X4[f], adjoining sub-carriers are different frequency signal components. Thus, when the number of transmission antennas is K, with respect to the ith position, that is, the ith sub-carrier of each of X1[f], X2[f], X3[f], and X4[f], a base frequency signal is determined according to a remainder number obtained when i is divided by K. Note that i is an integer equal to or larger than 0. For example, in a case of the four transmission antennas expressed in the expressions (25) to (28), K=4 and a base frequency signal is determined according to a remainder number obtained when i is divided by 4. For example, in a case where the remainder number obtained when i is divided by 4 is 0, the frequency signal expressed by the expression (25) is mapped. In X1[i], when the remainder obtained when i is divided by 4 is 0, a frequency Sa[f] is mapped. Also, in X2[i], when the remainder obtained when i is divided by 4 is 0, a frequency $S_b$[f] is mapped.

A configuration of a reception device that receives x1 [t], x2 [t], x3 [t], and x4 [t] transmitted from the four transmission antennas is similar to that of the reception device 2 in FIG. 2. However, an SFBC decoding unit 24 performs SFBC decoding corresponding to the four transmission antennas as described in the following. When relationships expressed in the above expressions (25) to (28) are acquired, the SFBC decoding unit 24 of the reception device performs SFBC decoding on signal sub-streams Sa[f], Sb[f], and Sc[f] as expressed in the following expressions (29) to (31) by using reception signals R[4f], R[4f+1], R[4f+2], and R[4f+3], and complex transmission functions H1[f], H2 [f], H3 [f], and $H_4$[f] of transmission channels between transmission antennas #1, #2, #3, and #4 and a reception antenna.

$$S'_a[f]=H^*_1[4f]R[4f]+H_2[4f+1]R^*[4f+1]+H_3[4f+2]R^*[4f+2]+H^*_4[4f+3]R[4f+3] \quad (29)$$

$$S'_b[f]=H^*_2[4f]R[4f]+H_1[4f\pm1]R^*[4f+1]+H^*_4[4f+2]R[4f+2]+H3[4f+3]R^*[4f+3] \quad (30)$$

$$S'_c[f]=H^*_3[4f]R[4f]\pm H^*_4[4f+1]R[4f+1]+H_1[4f+2]R^*[4f+2]+H_2[4f+3]R^*[4f+3] \quad (31)$$

Also, similarly to the expressions (16) to (20) in SFBC using two transmission antennas, an FDE unit 25 calculates an equivalent transmission channel value that is a coefficient of an intended signal component after SFBC decoding, divides SFBC decoding results S'a[f], S'b[f], and S'$_c$[f] by a square root of the equivalent transmission channel value, and performs FDE.

From the above, it is understood that the number of transmission antennas is not limited to two and that the present invention can be applied to the arbitrary number of transmission antennas in a case were SFBC coding can be realized by complex conjugate and sign inversion of a signal.

In the present embodiment, a case where the number of reception antennas is one has been described in order to simplify the description. However, this is not the limitation and decoding of the present embodiment can be applied to a case where a reception device includes a plurality of reception antennas. In a case where a plurality of reception antennas is included, when the number of reception antennas is $N_{rx}$, in SFBC with two transmission antennas, an equivalent transmission channel value according to the expression (16) is calculated for each reception antenna and an SFBC decoding result is divided by a square root of the equivalent transmission channel value for each reception antenna. Then, MMSE-FDE weight of the ith reception antenna is calculated by the following expression (32).

$$W_{a,i}[f]=\sqrt{(G_{a,i}[f])}/(\Sigma^{Nrx}_i(G_{a,i}[f])+\sigma^2) \quad (32)$$

Here, $W_{a,i}$[f] is MMSE-FDE weight of the ith reception antenna and $G_{a,i}$[f] is an equivalent transmission channel value after SFBC decoding in the ith reception antenna. Note that $\Sigma^{Nrx}_i$ indicates a total value from i=1 to i=$N_{rx}$. Multiplication of the MMSE-FDE weight expressed in the expression (32) is performed for each reception antenna and a total value of all reception antennas is calculated, that is, vector combination is performed. By performing vector combination at each $M_{sub}$ frequency point, it is possible to perform appropriate FDE.

Also, in the present embodiment, for simplification of the description, an embodiment in which SFBC for two transmission antennas is performed in a case where the number of transmission antennas is two or SFBC for four transmission antennas is performed in a case where the number of transmission antennas is four has been described as an example. However, this is not the limitation. The SFBC coding for two transmission antennas described in the first embodiment may be performed in an SFBC coding unit 12 with the number of transmission antennas being four and combination with delay processing may be performed.

Figure 12:
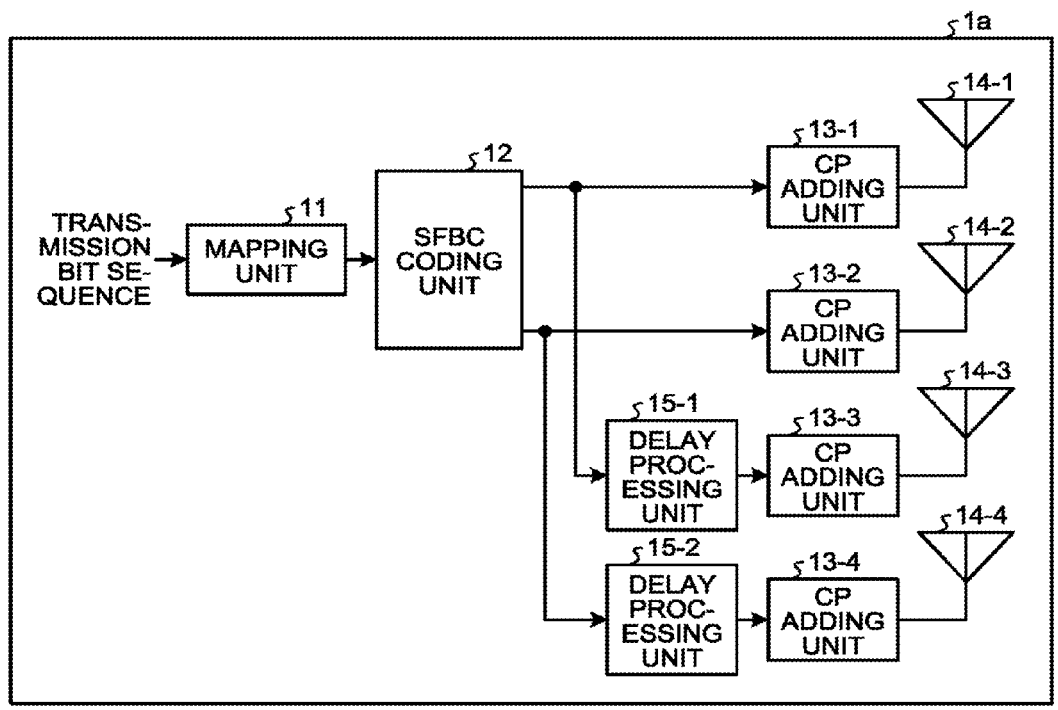
FIG. 12 is a diagram illustrating a configuration example of a transmission device of the first embodiment in a case where SFBC for two transmission antennas and delay processing are combined.

FIG. 12 is a diagram illustrating a configuration example of a transmission device in a case where SFBC for two transmission antennas and delay processing are combined. A transmission device 1a illustrated in FIG. 12 has a configuration in which transmission antennas 14-3 and 14-4, CP adding units 13-3 and 13-4, and delay processing units 15-1 and 15-2 are added to the transmission device 1 in FIG. 1. An SFBC coding unit 12 of the transmission device 1a performs the above-described SFBC coding processing for two transmission antennas and generates x1 [t] and x2[t]. The SFBC coding unit 12 outputs x1[t] to the CP adding unit 13-1, reproduces x1[t], and outputs the reproduced signal to the delay processing unit 15-1. Also, the SFBC coding unit 12 outputs x2[t] to the CP adding units 13-2, reproduces $x_2$[t], and outputs the reproduced signal to the delay processing unit 15-2. The delay processing units 15-1 and 15-2 perform delay processing on the input signals and respectively outputs these signals to the CP adding units 13-3 and 13-4. The CP adding units 13-3 and 13-4 add CP to the input signals and output the CP-added signals to the transmission antennas 14-3 and 14-4. The transmission antennas 14-3 and 14-4 output the input signals. Note that the delay processing units 15-1 and 15-2 may be in a subsequent stage to the CP adding units, for example. Also, the delay processing units 15-1 and 15-2 may perform cyclic delay processing, that is, CDD in a block.

Next, a hardware configuration of the present embodiment will be described. Each configuration element included in the transmission device 1 illustrated in FIG. 1 can be realized as hardware such as an electronic circuit or an antenna. The mapping unit 11 is a mapper or a modulator, the CP adding units 13-1 and 13-2 are CP adding circuits, and the transmission antennas 14-1 and 14-2 are antennas. Each configuration element of the transmission device 1a illustrated in FIG. 12 can be also realized as hardware such as an electronic circuit or an antenna. The delay processing units 15-1 and 15-2 are delay circuits.

A processing circuit that realizes the SFBC coding unit 12 may be dedicated hardware, or a control circuit including a memory, and a central processing unit (CPU) (also referred to as central processing device, processing device, operation device, microprocessor, microcomputer, processor, or digital signal processor (DSP)) that executes a program stored in the memory. Here, the memory is, for example, a non-volatile or volatile semiconductor memory such as a random access memory (RAM), a read only memory (ROM), a flash memory, an erasable programmable read only memory (EPROM), or an electrically erasable programmable read only memory (EEPROM), a magnetic disk, a flexible disk, an optical disk, a compact disc, a mini disc, or a digital versatile disk (DVD).

In a case where the SFBC coding unit 12 is realized by dedicated hardware, this is, for example, a single circuit, a combined circuit, a programmed processor, a parallel-programmed processor, an application specific integrated circuit (ASIC), a field programmable gate array (FPGA), or a combination thereof. For example, each of the signal dividing unit 121, the complex signal processing unit 122, the phase rotation unit 123, and the multiplexing unit 124 that are illustrated in FIG. 3 may be configured as a single electronic circuit.

Figure 13:
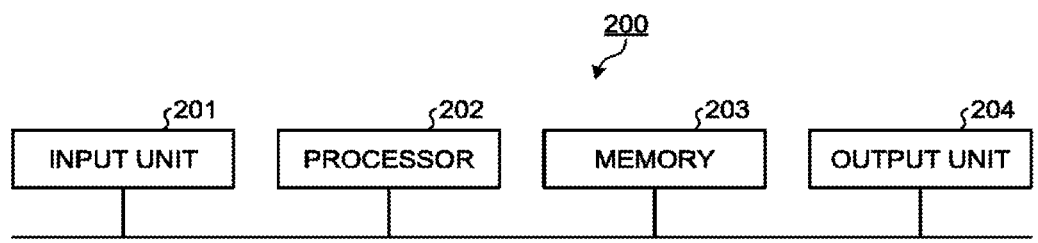
FIG. 13 is a diagram illustrating an example of a control circuit of the first embodiment.

In a case where the SFBC coding unit 12 is realized by a control circuit including a CPU, this control circuit is, for example, a control circuit 200 of a configuration illustrated in FIG. 13. As illustrated in FIG. 13, the control circuit 200 includes an input unit 201 that is a reception unit to receive data input from the outside, a processor 202 that is a CPU, a memory 203, and an output unit 204 that is a transmission unit to transmit data to the outside. The input unit 201 is an interface circuit that receives data input from the outside of the control circuit 200 and gives the data to the processor 202 and the output unit 204 is an interface circuit that transmits data from the processor 202 or the memory 203 to the outside of the control circuit 200. In a case of being realized by the control circuit 200 illustrated in FIG. 13, the SFBC coding unit 12 is realized by the processor 202 reading and executing a program that is stored in the memory 203 and that corresponds to processing of the SFBC coding unit 12. Also, the memory 203 is used as a temporary memory in each kind of processing performed by the processor 202.

Also, each configuration element included in the reception device 2 illustrated in FIG. 2 can be realized as hardware such as an electronic circuit. The reception antenna 21 is an antenna, the CP removing unit 22 is a CP removing circuit, the DFT unit 23 is a DFT circuit, the FDE unit 25 is a frequency-domain equalizer, the IDFT unit 26 is an IDFT circuit, and the demapping unit 27 is a demapper or a decoder.

A processing circuit that realizes the SFBC decoding unit 24 may be dedicated hardware, or a control circuit including a memory and a CPU to execute a program stored in the memory.

In a case where the SFBC decoding unit 24 is realized by dedicated hardware, this is, for example, a single circuit, a combined circuit, a programmed processor, a parallel-programmed processor, ASIC, FPGA, or a combination thereof.

In a case where the SFBC decoding unit 24 is realized by a control circuit including a CPU, this control circuit is, for example, a control circuit 200 of a configuration illustrated in FIG. 13. In a case of being realized by the control circuit 200 illustrated in FIG. 13, the SFBC decoding unit 24 is realized by the processor 202 reading and executing a program that is stored in the memory 203 and that corresponds to processing of the SFBC decoding unit 24.

Note that in the above description, the description is made on the premise that Alamouti coding disclosed in Non Patent Literature 2 and 3 is applied. However, this is not the limitation. As coding of the present invention, for example, coding that is called a quasi-orthogonal type and that is disclosed in H. Jafarkhani, "A quasi-orthogonal space-time block code," IEEE Trans. Commun. Lett., vol. 49, no. 1, pp. 1-4, January 2001. can be applied. Different coding can be also applied as long as the coding is SFBC of performing coding by complex conjugate and sign inversion of a signal. Also, SCBT is presented as a preferable transmission system for the present invention. However, this is not the limitation and the present invention can be applied to an arbitrary transmission system.

As described above, in the present embodiment, in the SFBC coding, while the above-described sub-stream among signal sub-streams generated by equal division of a signal is output as it is, time-axis inversion processing, complex conjugate processing and sign inversion processing, or time-axis inversion processing and complex conjugate processing are performed on the above-described sub-stream, and repetitive signals with a time length N in which a processed sub-stream and a sub-stream not yet processed are respectively repeated in a time direction are generated. Then, phase rotations to give different phase rotations to repetitive signals multiplexed to an identical signal in a multiplexing unit in the subsequent stage are given and the repetitive signals to which different phase rotations have been given are multiplexed, whereby a transmission signal is generated. Thus, unlike the technologies which are described in Non Patent Literature 3 and Non Patent Literature 4 and in which coding is performed between sub-carriers away from each other in a frequency domain, SFBC between adjoining sub-carriers can be realized. Thus, it is possible to suppress deterioration in a transmission characteristic. Moreover, since only time-domain processing of signal equal division, time-axis inversion, complex conjugate, sign inversion, reproduction, phase rotation, and combination is performed on temporally-successive signal streams, great PAPR deterioration does not occur, compared to the technology in Non Patent Literature 3. Also, since whole SFBC coding processing is performed in a time domain, a device configuration can be simple compared to the technology in Non Patent Literature 3.

Second Embodiment

Next, SFBC coding of the second embodiment according to the present invention will be described. A configuration of a transmission device of the present embodiment is similar to that of the transmission device 1 of the first embodiment. However, in the present embodiment, an SFBC coding unit 12 performs SFBC coding described in the following. A configuration of a reception device of the present embodiment is similar to that of the reception device 2 of the first embodiment. However, an SFBC decoding unit 24 performs SFBC decoding described in the following. In the following, a part different from the first embodiment will be described and an overlapped description of a part similar to the first embodiment is omitted.

In the present embodiment, a signal dividing unit 121 of an SFBC coding unit 12 of a transmission device 1 performs a cyclic shift of one of s121a and s121b in a time length to be a non-integral sample value Δt, that is, a non-integer value. That is, a cyclic shift is performed in a time length in which a value divided by a primary modulation symbol interval of a signal sub-stream becomes a non-integer. Accordingly, PAPR deterioration of a transmission signal waveform after SFBC coding is decreased. The SFBC decoding unit 24 of the reception device 2 puts back a phase rotation corresponding to a cyclic shift in the transmission device 1. In the present embodiment, for simplification of a description, the number of transmission antennas is two and the number of reception antennas is one. However, as described in the first embodiment, the present invention can be also applied even in a case where there are three or more transmission antennas and a case where there is a plurality of reception antennas.

In the following, SFBC coding and SFBC decoding of the present embodiment will be described in detail. Similarly to the first embodiment, a signal dividing unit 121 generates signal sub-streams sa[t] and sb[t] by equally dividing a signal stream. Then, the signal dividing unit 121 performs a cyclic shift of sa[t] or $s_b[t]$ by a non-integral sample value Δt. In the following, similarly to the first embodiment, the operations by a complex signal processing unit 122, a phase rotation unit 123, and a multiplexing unit 124 are performed.

Figure 14:
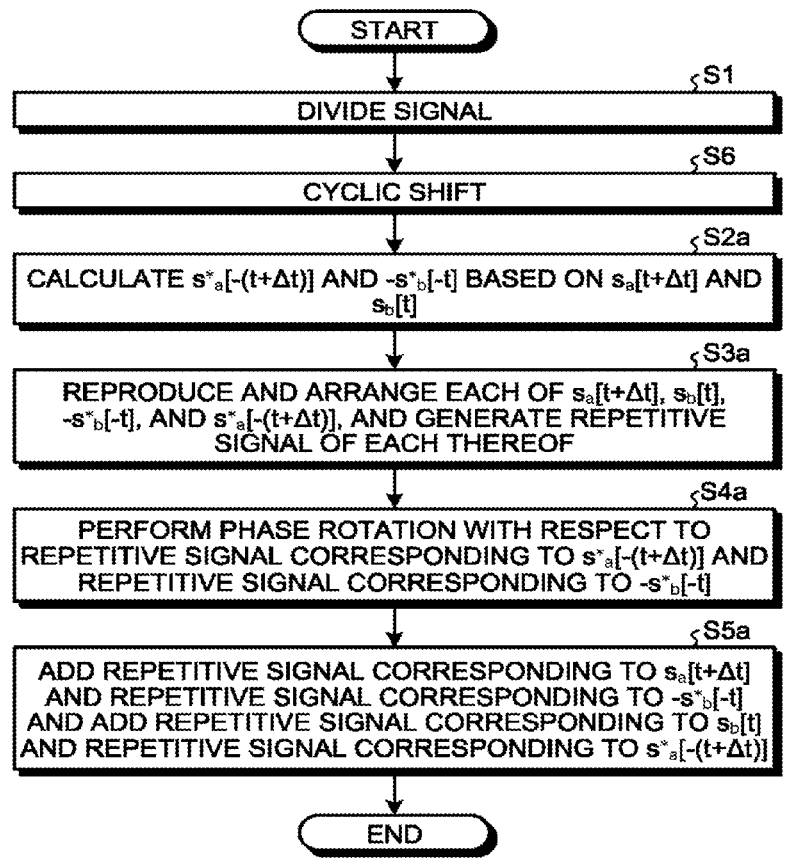
FIG. 14 is a flowchart illustrating an example of a processing procedure in an SFBC coding unit of a second embodiment.
Figure 15:
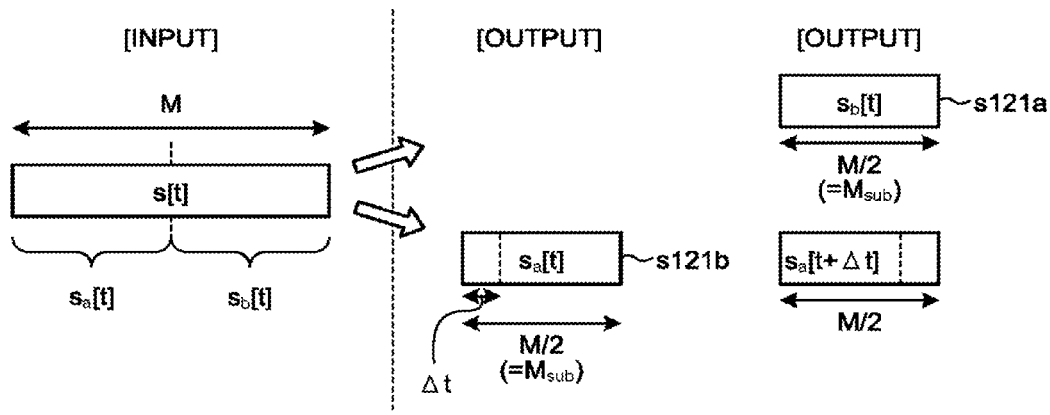
FIG. 15 is a diagram illustrating an example of processing in a signal dividing unit of the second embodiment.

FIG. 14 is a flowchart illustrating an example of a processing procedure in the SFBC coding unit 12 of the present embodiment. In FIG. 14, an example of performing a cyclic shift of sa[t] will be described. However, as described above, a cyclic shift of sb[t] may be performed instead of the cyclic shift of sa[t]. Step S1 is similar to that of the first embodiment. After step S1, the SFBC coding unit 12 performs a cyclic shift of sa[t] and generates sa[t+Δt] (step S6). More specifically, the signal dividing unit 121 performs a cyclic shift of $s_a[t]$ by a non-integral sample value Δt. FIG. 15 is a diagram illustrating an example of processing in the signal dividing unit 121 of the present embodiment. Note that in this cyclic shift, in a case where s[t] is input as a sampled signal, when a cyclic shift by the non-integral sample value Δt is performed, the cyclic shift by the non-integral sample value Δt is performed after interpolation between input primary modulation symbols, for example. For example, in a case where Δt corresponds to 1.2 samples, in the cyclic shift, a cyclic shift by 0.2 samples is further performed after a cyclic shift by one sample. A point that is shifted by 0.2 samples can be calculated by interpolation between primary modulation symbols.

Next, the SFBC coding unit 12 calculates $s^*_a[-(t+\Delta t)]$ and $-s^*_b[-t]$ on the basis of $s_a[t+\Delta t]$ and $s_b[t]$ (step S2a). More specifically, the complex signal processing unit 122 generates $s^*_a[-(t+\Delta t)]$ by performing time-axis inversion and complex conjugate on $s_a[t]$ and generates $-s^*_b[-t]$ by performing time-axis inversion, complex conjugate and sign inversion on $s_b[t]$. The complex signal processing unit 122 outputs $s_a[t+\Delta t]$, $s_b[t]$, $s^*_a[-(t+\Delta t)]$, and $-s^*_b[-t]$ to the phase rotation unit 123.

Then, the SFBC coding unit 12 reproduces and arranges each of $s_a[t+\Delta t]$, $s_b[t]$, $s^*_a[-(t+\Delta t)]$, and $-s^*_b[-t]$ and generates repetitive signals thereof (step S3a). More specifically, the phase rotation unit 123 generates signals of a time length N in which $s_a[t+\Delta t]$, $s_b[t]$, $s^*_a[-(t+\Delta t)]$, and $-s^*_b[-t]$ are respectively reproduced and arranged, that is, repetitive signals each of which has two sub-streams of the same contents arranged and the same length N as the time length N of a signal stream. Then, the phase rotation unit 123 of the SFBC coding unit 12 performs phase rotation processing on each of a repetitive signal corresponding to $s^*_a[-(t+\Delta t)]$ and a repetitive signal corresponding to $-s^*_b[-t]$ (step S4a).

Then, a multiplexing unit 14 of the SFBC coding unit 12 adds a repetitive signal corresponding to $s_a[t+\Delta t]$ and the repetitive signal corresponding to $-s^*_b[-t]$ and adds a repetitive signal corresponding to $s_b[t]$ and the repetitive signal corresponding to $s^*_a[-(t+\Delta t)]$ (step S5a). Signals $x_1[t]$ and $x_2[t]$ acquired by the addition are respectively output to CP adding units 13-1 and 13-2.

For example, in a case where a cyclic shift of sa[t] is performed by Δt, the transmission signals x1[t] and x2[t] can be expressed by next expressions (33) and (34) by using sa[t] and $s_b[t]$.

$$x_1[t]=s_a[(t+\Delta t) \bmod M_{sub}]-s^*_b[(N-t) \bmod M_{sub}] \times \exp(j2\pi t/N) \quad (t=0,\ldots,N-1) \quad (33)$$

$$x_2[t]=s_b[t \bmod M_{sub}]+s^*_a[(N-(t+\Delta t)) \bmod M_{sub}] \times \exp(j2\pi t/N) \quad (t=0,\ldots,N-1) \quad (34)$$

As expressed in the above expression (5), a cyclic shift of a signal in a time domain becomes a phase rotation in proportional to a frequency in a frequency domain. That is, frequency signals of the transmission signals x1[t] and $x_2[t]$ can be expressed by the following expressions (35) and (36).

$$X1[2f]=Sa[f]\exp(j2\pi f\Delta t/N), X2[2f]=S_b[f] \quad (35)$$

$$X_1[2f+1]=-S^*_b[f], X_2[2f+1]=S^*_a[f]\exp(j2\pi f\Delta t/N) \quad (36)$$

In the second embodiment, the SFBC decoding unit 24 of the reception device 2 can acquire an original signal sub-stream signal component by performing, on the SFBC-decoded S'a[f], multiplication by exp(-j2πfΔt/N) to give a phase rotation, that is, by performing, on the SFBC-decoded S'ζ_a[f], a phase rotation to cancel a cyclic shift. Note that in the reception device 2, instead of cancelation of a cyclic shift in a frequency domain, after transformation into a time signal is made by IDFT, the demapping unit 27 may perform processing of canceling a cyclic shift, that is, perform a cyclic shift in the opposite direction to a cyclic shift performed in the transmission device 1a, by the same shift amount as that of the cyclic shift performed in the transmission device 1a.

In the above description, a case where a cyclic shift of the signal sub-stream sa[t] is performed with a non-integral sample value has been described as an example. However, this is not the limitation and a cyclic shift of sb[t] may be performed. Also, as described in the first embodiment, the cyclic shift described in the present embodiment may be applied to a case where SFBC, which is other than that for two transmission antennas, such as that for four transmission antennas is used. For example, in a case where SFBC for four transmission antennas described in the first embodiment is used, a cyclic shift of sa[t] may be performed, a cyclic shift of sb[t] may be performed, or a cyclic shift of $s_c[t]$ may be performed. That is, a cyclic shift of a part of signal sub-streams generated by equal division in the signal dividing unit 121 is performed with a non-integral sample value.

Also, in the above example, a method in which the SFBC decoding unit 24 of the reception device 2 acquires an original signal sub-stream signal component by performing a phase rotation of exp(-j2πfΔt/N) after decoding, has been described. However, this is not the limitation and a complex transmission function including a phase rotation by a cyclic shift may be estimated in a case where a complex transmission function of a transmission channel is estimated on a reception side. In this case, it is possible to perform demodulation without specifically considering an influence of phase rotation.

Also, in a case where delay processing is performed as illustrated in FIG. 12 of the first embodiment, the cyclic shift described in the present embodiment may be applied.

As described above, in the present embodiment, a cyclic shift of a part of signal sub-streams among signal sub-streams generated by equal division is performed with a non-integral sample value. Thus, a multi-path diversity effect is acquired along with an effect similar to that of the first embodiment.

Third Embodiment

Figure 16:
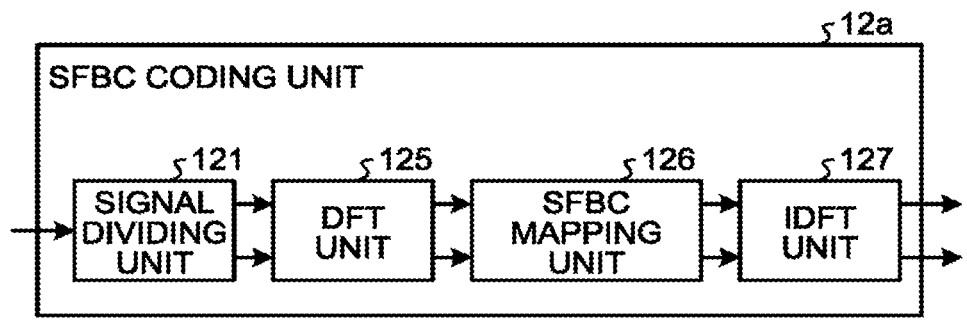
FIG. 16 is a diagram illustrating a configuration example of an SFBC coding unit of a third embodiment.

FIG. 16 is a diagram illustrating a configuration example of an SFBC coding unit of a third embodiment according to the present invention. A configuration of a transmission device of the present embodiment is similar to the configuration of the transmission device 1 except for a point that the SFBC coding unit 12 of the transmission device 1 of the first embodiment is replaced with an SFBC coding unit 12a illustrated in FIG. 16. To a configuration element having a function similar to that of the first embodiment, a sign identical to that of the first embodiment is assigned and an overlapped description is omitted. In the following, a part different from the first embodiment will be described.

The SFBC coding unit 12a of the present embodiment includes a signal dividing unit 121 similar to that of the first embodiment, a DFT unit 125 that transforms a signal sub-stream into a frequency signal by DFT, an SFBC mapping unit 126 that is a frequency arranging unit to perform SFBC mapping in a frequency domain, and an IDFT unit 127 that transforms an SFBC-mapped signal into a time signal by IDFT.

Next, an operation of the SFBC coding unit 12a of the present embodiment will be described. Here, the description is made as to, as an example, SFBC with two transmission antennas. Since processing by the signal dividing unit 121 is identical to that of the first embodiment, a description thereof is omitted. The DFT unit 125 respectively transforms sa[t] and sb[t] that are signal sub-streams into frequency signals Sa[f] and Sb[f] by $M_{sub}$-point DFT and inputs the transformed signals into the SFBC mapping unit 126.

Figure 17:
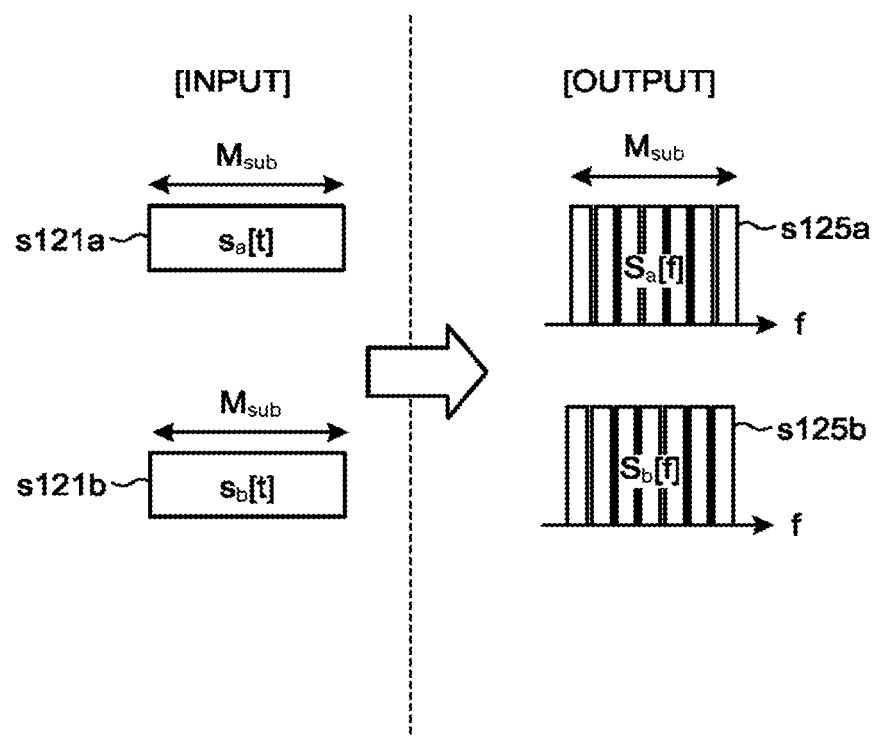
FIG. 17 is a diagram illustrating processing of a DFT unit in a transmission device of the third embodiment.

FIG. 17 is a diagram illustrating processing by the DFT unit 125 in the transmission device of the third embodiment. To the DFT unit 125, signals s121a and s121b, that is, sa[t] and sb[t] that are time signals of time lengths Msub are input from the signal dividing unit 121. The DFT unit 125 performs Msub-point DFT on each of sa[t] and sb[t] and outputs frequency signals Sa[f] and $S_b$[f] as signals s125a and s125b.

The SFBC mapping unit 126 performs, in a frequency domain, processing equivalent to the processing by the complex signal processing unit 122, the phase rotation unit 123, and the multiplexing unit 124 of the first embodiment. That is, the processing expressed in the expressions (10) and (11) are performed. That is, the SFBC mapping unit 126 generates complex-processed frequency signals $-S^*_b$[f] and $S^*_a$[f] by using frequency signals $S_a$[t] and $S_b$[f], and performs mapping of the frequency signals $S_a$[f], $S_b$[f], $-S^*_b$[f], and $S^*_a$[f] in frequency signals $X_1$[f] and $X_2$[f], that is, performs frequency arrangement according to the expressions (10) and (11).

Also, the cyclic shift described in the second embodiment may be further performed. In this case, the SFBC mapping unit 126 performs processing expressed in an expression (35) and an expression (36). In this case, for example, as expressed in the expressions (35) and (36), the SFBC mapping unit 126 gives one or more frequency signals of the frequency signals $S_a$[f] and $S_b$[f] a phase rotation corresponding to a cyclic shift in a time domain and gives a phase rotation corresponding to a cyclic shift in a time domain, to one or more complex signals corresponding to one or more of the frequency signals $S_a$[f] and $S_b$[f] to which the phase rotation has been given. Then, a frequency signal to which phase rotation is not given, a complex-processed frequency signal to which phase rotation is not given, a frequency signal to which phase rotation has been given, a complex-processed frequency signal to which phase rotation has been given are mapped in $X_1$[f] and $X_2$[f]. That is, the SFBC mapping unit 126 generates complex-processed frequency signals $-S^*_b$[f] and $S^*_a$[f] that are signals generated by performing on frequency signals $S_a$[f] and $S_b$[f] complex conjugate processing and sign inversion processing, or the complex conjugate processing, and gives a phase rotation in proportional to a frequency corresponding to a cyclic shift in a time domain, to first frequency signals that are one or more frequency signals of the frequency signals $S_a$[f] and $S_b$[f] and first complex-processed frequency signals that are complex-processed frequency signals corresponding to the first frequency signals. In an example of the expressions (35) and (36), the first frequency signal is the frequency signal $S_a$[f] and the first complex-processed frequency signal is $S^*_a$[f]. The SFBC mapping unit 126 performs mapping of a second frequency signal that is a frequency signal other than the first frequency signals, a second complex-processed frequency signal that is a complex-processed frequency signal corresponding to the second frequency signal, the first frequency signals to which the phase rotation has been given, and the first complex-processed frequency signals to which the phase rotation has been given, in a frequency domain according to the expressions (35) and (36), that is, performs the mapping in $X_1$[f] and $X_2$[f] according to the expressions (35) and (36). In the example of the expressions (35) and (36), the second frequency signal is the frequency signal $S_b$[f] and the second complex-processed frequency signal is $-S^*_b$[f]. The frequency signals $X_1$[f] and $X_2$[f] processed by the SFBC mapping unit 126, that is, frequency arrangement signals have a sequence length N.

The IDFT unit 127 of the transmission device of the present embodiment performs IDFT of N points or more on the frequency signals X1[f] and X2[f] and outputs transmission signals x1[t] and $x_2$[t] that are time signals. Operations of CP adding units 13-1 and 13-2 and transmission antennas 14-1 and 14-2 are similar to those of the first embodiment.

A transmission signal transmitted from the transmission device of the present embodiment is similar to that of the first embodiment or the second embodiment. Thus, a reception device that receives the transmission signal transmitted from the transmission device of the present embodiment can use the reception device described in the first embodiment or the second embodiment.

In the above description, a case where there are two transmission antennas has been described. However, this is not the limitation. As described in the first embodiment and the second embodiment, a configuration and an operation of the third embodiment can be applied with respect to the arbitrary plural number of transmission antennas. For example, in SFBC with four transmission antennas, the SFBC mapping unit 126 performs the processing expressed by the expressions (25) to (28).

A processing circuit that realizes the SFBC coding unit 12a may be dedicated hardware or a control circuit including a memory and a CPU to execute a program stored in the memory.

In a case where the SFBC coding unit 12a is realized by decicated hardware, this is, for example, a single circuit, a combined circuit, a programmed processor, a parallel-programmed processor, ASIC, FPGA, or a combination thereof. The SFBC coding unit 12a includes, for example, a DFT circuit that realizes the DFT unit 125, a mapper that realizes the SFBC mapping unit 126, and an IDFT circuit that realizes the IDFT unit 127.

In a case where the SFBC coding unit 12a is realized by a control circuit including a CPU, this control circuit is, for example, the control circuit 200 of a configuration illustrated in FIG. 13. In a case of being realized by the control circuit 200 illustrated in FIG. 13, the SFBC coding unit 12a is realized by a processor 202 reading and executing a program that is stored in a memory 203 and that corresponds to the processing in the SFBC coding unit 12a.

As described above, in the present embodiment, in the transmission device, the signal sub-stream is transformed into the frequency signal, processing equivalent to processing by the complex signal processing unit 122, the phase rotation unit 123, and the multiplexing unit 124 of the first embodiment is performed in the frequency domain, and the processed signal is transformed into the time signal and is transmitted. Thus, unlike the technology which is described in Non Patent Literature 4 and in which coding between sub-carriers away from each other in a frequency domain is performed, SFBC between the adjoining sub-carriers can be realized. Also, PAPR deterioration can be reduced compared to the technology described in Non Patent Literature 3.

Fourth Embodiment

Figure 18:
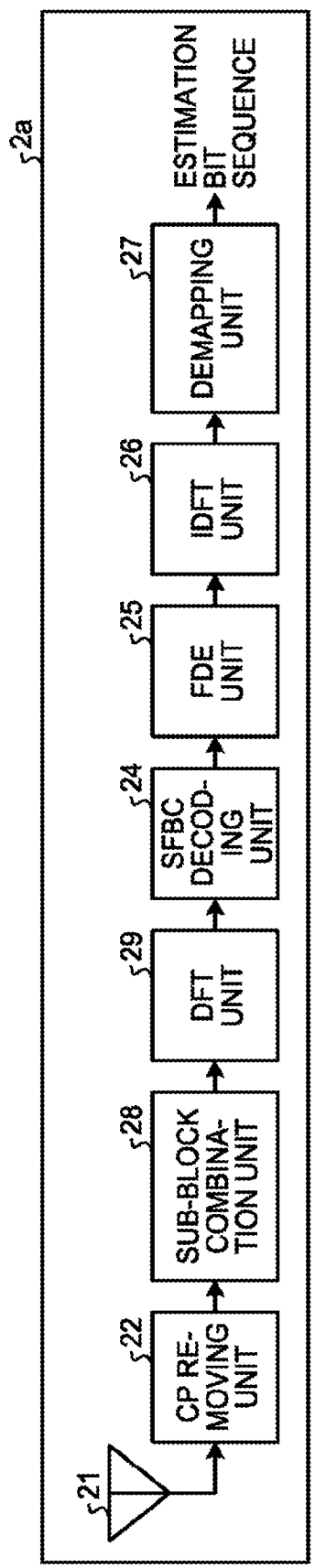
FIG. 18 is a diagram illustrating a configuration example of a reception device of a fourth embodiment.

FIG. 18 is a diagram illustrating a configuration example of a reception device of the fourth embodiment according to the present invention. A reception device 2a of the present embodiment is a reception device that receives a transmission signal transmitted from the transmission device of the first, second, or third embodiment. The reception device 2a performs division, combination, and phase rotation of a time signal and performs SFBC decoding after $M_{sub}$-point DFT.

The reception device 2a of the present embodiment includes a reception antenna 21, a CP removing unit 22, a sub-block combination unit 28 that divides and combines a reception signal, a DFT unit 29 that performs DFT on the signal processed by the sub-block combination unit 28 and performs transformation into a frequency signal, an SFBC decoding unit 24, an FDE unit 25, an IDFT unit 26, and a demapping unit 27. To a configuration element having a function similar to that of the first embodiment, a sign identical to that of the first embodiment is assigned, and an overlapped description is omitted. In the following, a part different from the first embodiment will be described.

Next, an operation of the reception device 2a of the present embodiment will be described. In the following, for simplification of the description, a description is made on the assumption that SFBC is for transmission with two antennas and that the number of reception antennas is one. Since operations of the reception antenna 21 and the CP removing unit 22 are similar to those of the first embodiment, a description thereof is omitted.

Figure 19:
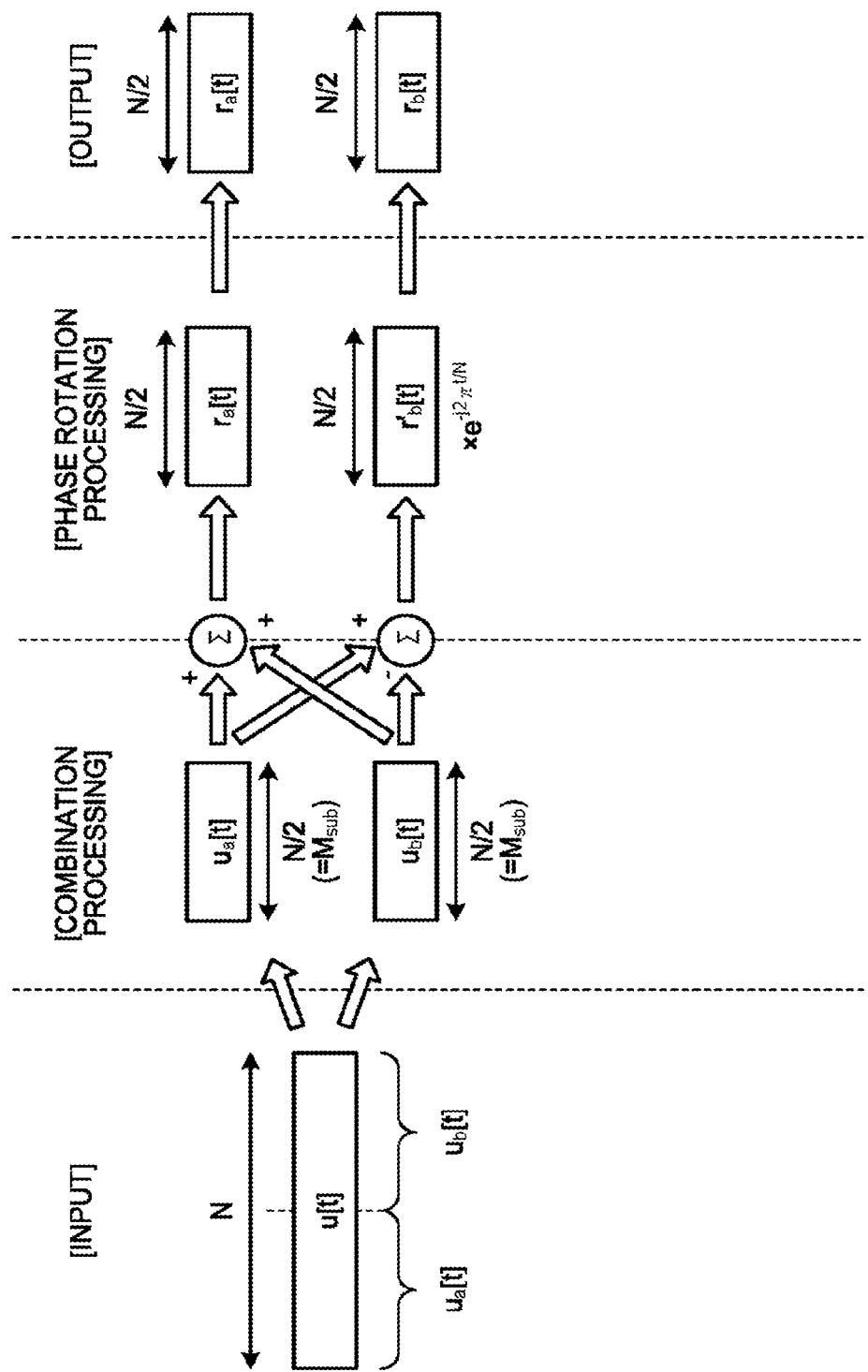
FIG. 19 is a diagram schematically illustrating processing of a sub-block combination unit of the fourth embodiment.

FIG. 19 is a diagram schematically illustrating processing of the sub-block combination unit 28. The sub-block combination unit 28 equally divides a block u[t] of a reception signal of a time length N that is input from the CP removing unit 22. The number of times of division in the equal division by the sub-block combination unit 28 is the same as the number of times of division in the signal dividing unit 121 of the transmission device 1 and the number of times of division C=2 in a case of SFBC with two transmission antennas. Thus, the sub-block combination unit 28 equally divides u[t] into two that are a first half and a second half that are set as sub-blocks ua[t] and ub[t]. Next, the sub-block combination unit 28 combines the divisions ua[t] and ub[t] in a manner expressed in the following expressions (37) and (38) to acquire ra[t] and r' b[t].

$$ra[t]=ua[t]+u_b[t] \tag{37}$$

$$r'b[t]=ua[t]-u_b[t] \tag{38}$$

As it is understood from the expressions (8) and (9), and FIG. 7 that are described in the first embodiment, a phase of a component to which a phase rotation of exp(j2πt/N) has been given for a sub-carrier shift among signals transmitted from the transmission device is rotated for 2π in a block length N of one block. Thus, the first half and the second half of a block are in a relationship of sign inversion. Thus, in the combination in the expression (37), a sub-stream component to which phase rotation has been given is canceled. Inversely, in the combination in the expression (38), a sub-stream component without phase rotation is canceled. That is, the sub-block combination unit 28 generates a combination signal for each phase rotation amount given in the transmission device 1.

Then, the sub-block combination unit 28 gives a phase rotation of exp(−j2πt/N) to r'b[t] that is a result of extraction of a component to which the phase rotation of exp(j2πt/N) has been given, and removes an influence of a sub-carrier shift given on a transmission side. A result of giving the phase rotation of exp(−j2πt/N) to r'b[t] is set as rb[t]. The sub-block combination unit 28 does not perform any processing on ra[t]. The sub-block combination unit 28 outputs ra[t] and $r_b$[t] to the DFT unit 29.

Unlike the DFT unit 23 in the first to third embodiments, the DFT unit 29 performs N/2-point DFT on the input ra[t] and rb[t]. When frequency signals transformed into a frequency domain by the DFT unit 29 are Ra[f] and $R_b$[f], these signals correspond to R[2f] and R[2f+1] expressed in the expressions (12) and (13). That is, the following expressions (39) and (40) are established.

$$R_a[f]=R[2f] \tag{39}$$

$$R_b[f]=R[2f+1] \tag{40}$$

Processing by the SFBC decoding unit 24, the FDE unit 25, the IDFT unit 26, and the demapping unit 27 in the subsequent stages is performed in a manner similar to that in each of the first to third embodiments. In a case of receiving a signal transmitted from the transmission device described in the second embodiment, the SFBC decoding unit 24 gives a phase rotation of exp(−j2πfΔt/N) after decoding similarly to the reception device of the second embodiment.

Note that the sub-block combination unit 28 may be dedicated hardware or a control circuit including a memory and a CPU to execute a program stored in the memory.

In a case where the sub-block combination unit 28 is realized by dedicated hardware, this is, for example, a single circuit, a combined circuit, a programmed processor, a parallel-programmed processor, ASIC, FPGA, or a combination thereof.

In a case where the sub-block combination unit 28 is realized by a control circuit including a CPU, this control circuit is, for example, a control circuit 200 of a configuration illustrated in FIG. 13. In a case of being realized by the control circuit 200 illustrated in FIG. 13, the SFBC decoding unit 24 is realized by a processor 202 reading and executing a program that is stored in a memory 203 and that corresponds to the processing of the sub-block combination unit 28.

As described above, in the present embodiment, the sub-block combination unit 28 generates the first signal that is a component to which phase rotation has been given in the transmission device and a second signal that is a component to which a phase rotation is not given, by dividing and combining the block of the time length N of the reception signal and gives the first signal a phase rotation to cancel the phase rotation given in the transmission device. In this manner, in the present embodiment, it is described that R[2f] and R[2f+1] can be calculated by a method different from that of the first embodiment. In the present embodiment, an effect similar to that of the first embodiment can be also acquired.

Fifth Embodiment

Figure 20:
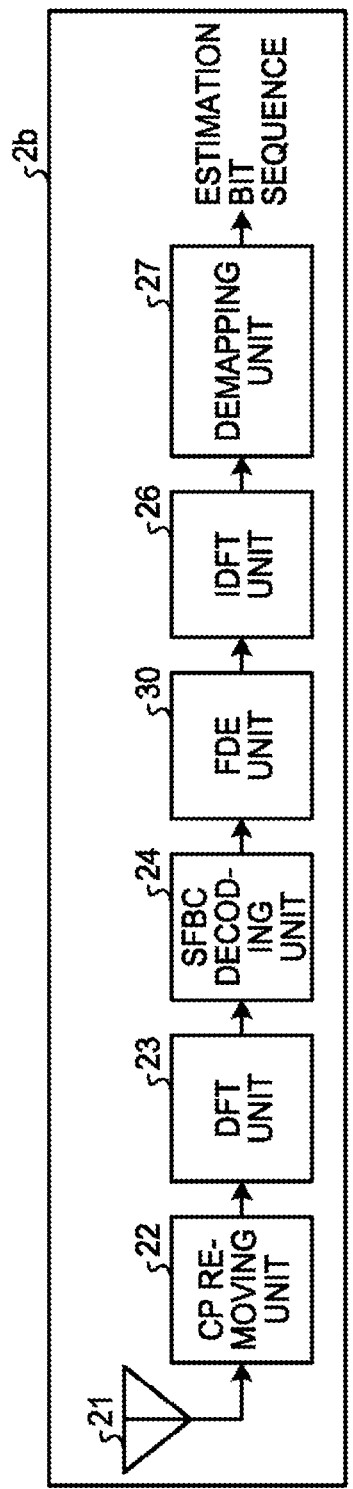
FIG. 20 is a diagram illustrating a configuration example of a reception device of a fifth embodiment.

FIG. 20 is a diagram illustrating a configuration example of a reception device of the fifth embodiment according to the present invention. A reception device 2b of the present embodiment is a reception device that receives a transmission signal transmitted from the transmission device of the first, second, or third embodiment. The reception device 2b performs FDE including removal of a remaining interference component after SFBC decoding.

The reception device 2b of the present embodiment includes a reception antenna 21, a CP removing unit 22, a DFT unit 23, an SFBC decoding unit 24, an FDE unit 30 that performs FDE including removal of a remaining interference component after SFBC decoding, an IDFT unit 26, and a demapping unit 27. To a configuration element having a function similar to that of the first embodiment, a sign identical to that of the first embodiment is assigned, and an overlapped description is omitted. In the following, a part different from the first embodiment will be described.

Next, an operation of the reception device 2b of the present embodiment will be described. In the following, for simplification of the description, a description is made on the assumption that SFBC is for transmission with two antennas and that the number of reception antennas is one. Since operations of the reception antenna 21, the CP removing unit 22, the DFT unit 23, the SFBC decoding unit 24, the IDFT unit 26, and the demapping unit 27 are similar to those of the first embodiment, a description thereof is omitted.

Here, a two-dimensional normalized SFBC decoding signal vector Y(bold)[f] including Ya[f] and $Y_b$[f] that are normalized SFBC decoding signals expressed in the expressions (17) and (20) is defined in a manner expressed in the following expression (41).

[Equation 1]

$$Y[f] = \begin{pmatrix} Y_a[f] \\ Y_b[f] \end{pmatrix} \quad (41)$$

According to the expressions (14) to (17), (19), and (20), a 2-by-2 equivalent transmission channel matrix H(bold)'[2f, 2f+1] after SFBC decoding is defined in a manner expressed in the expression (42).

[Equation 2]

$$H'[2f, 2f+1] = \begin{pmatrix} \sqrt{(|H_1[2f]|^2 + |H_2[2f+1]|^2)} & \dfrac{H_1^*[2f]H_2[2f] - H_1^*[2f+1]H_2[2f+1]}{\sqrt{(|H_1[2f]|^2 + |H_2[2f+1]|^2)}} \\ \dfrac{H_1[2f]H_2^*[2f] - H_1[2f+1]H_2^*[2f+1]}{\sqrt{(|H_2[2f]|^2 + |H_1[2f+1]|^2)}} & \sqrt{(|H_2[2f]|^2 + |H_1[2f+1]|^2)} \end{pmatrix}$$

$$= \begin{pmatrix} \sqrt{(G_a[f])} & \dfrac{H_1^*[2f]H_2[2f] - H_1^*[2f+1]H_2[2f+1]}{\sqrt{(G_a[f])}} \\ \dfrac{H_1[2f]H_2^*[2f] - H_1[2f+1]H_2^*[2f+1]}{\sqrt{(G_b[f])}} & \sqrt{(G_b[f])} \end{pmatrix} \quad (42)$$

A two-dimensional transmission signal vector S(bold)[f] including frequency signals Sa[f] and $S_b$[f] of transmission signal sub-streams is defined in a manner expressed in an expression (43).

[Equation 3]

$$S[f] = \begin{pmatrix} S_a[f] \\ S_b[f] \end{pmatrix} \quad (43)$$

Also, a two-dimensional normalization equivalent noise vector N(bold)'[f] after the SFBC decoding is defined in a manner expressed in an expression (44). Here, as described in the first embodiment, an average value of each of elements N'$_a$[f] and N'$_b$[f] of N(bold)'[f] is zero and dispersion thereof is $\sigma^2$.

[Equation 4]

$$N'[f] = \begin{pmatrix} N'_a[f] \\ N'_b[f] \end{pmatrix} = \begin{pmatrix} N_a[f]/\sqrt{(G_a[f])} \\ N_b[f]/\sqrt{(G_b[f])} \end{pmatrix} \quad (44)$$

By using the expressions (41) to (44), the normalized SFBC decoding signal vector Y(bold)[f] can be expressed in a manner expressed in the following expression (45).

[Equation 5]

$$Y[f]=H'[2f,2f+1]S[f]+N'[f] \quad (45)$$

Here, in a case where frequency selectivity of a transmission channel can be ignored between adjoining sub-carriers, a non-diagonal term of the equivalent transmission channel matrix H(bold)'[2f, 2f+1] becomes close to zero. However, in a case where frequency selectivity of a transmission channel cannot be ignored between adjoining sub-carriers, a non-diagonal term of the equivalent transmission channel matrix H(bold)'[2f, 2f+1] remains as a mutual interference component of $S_a[f]$ and $S_b[f]$ after the SFBC decoding. MMSE-FDE weight W(bold) [f] including removal of this mutual interference component is calculated by the following expression (46) using H(bold)' [2f, 2f+1].

[Equation 6]

$$W[f]=(H^H[2f,2f+1]H'[2f,2f+1]+\sigma^2 I)^{-1}H^H[2f,2f+1] \quad (46)$$

Here, H(bold)$^H$[2f, 2f+1] indicates the Hermitian transpose of H(bold)'[2f, 2f+1] and I (bold) is a two-dimensional unit matrix. The FDE unit 30 multiplies Y(bold) [f] by the MMSE-FDE weight matrix calculated by the expression (46), from a left side. Then, the IDFT unit 26 in a subsequent stage acquires $y_a[t]$ and $y_b[t]$ that are estimation signal sub-streams for $s_a[t]$ and $s_b[t]$ by performing $M_{sub}$-point IDFT.

In the above description, an example in which the number of reception antennas is one has been described. However, this is not the limitation and the operation of the fifth embodiment can be also applied to a case where a plurality of reception antennas is included. In a case where Nrx reception antennas are included, MMSE-FDE weight calculation of the expression (46) is performed with the normalized SFBC decoding signal vector Y(bold)[f] as a 2Nrx dimensional vector stacked by the number of reception antennas and with the equivalent transmission channel matrix H(bold)'[2f, 2f+1] as a $2N_{rx}$-by-2 matrix stacked in a row direction by the number of reception antennas. Thus, FDE including interference removal can be realized similarly.

As described above, in the present embodiment, in the reception device, FDE is performed including the removal of the remaining interference component after SFBC decoding. Thus, it is possible to accurately estimate a transmitted bit sequence.

In the above, the present invention has been described based on the embodiments. It is obvious that there are various modification examples in a combination of configuration elements or processing processes of these embodiments.

REFERENCE SIGNS LIST 1, 1a transmission device, 2, 2a, 2b reception device, 11 mapping unit, 12 SFBC coding unit, 13-1 to 13-CP adding unit, 14-1 to 14-4 transmission antenna, 15-1, 15-2 delay processing unit, 21 reception antenna, 22 CP removing unit, 23, 29, 125 DFT unit, 24 SFBC decoding unit, 25, 30 FDE unit, 26, 127 IDFT unit, 27 demapping unit, 28 sub-block combination unit, 121 signal dividing unit, 122 complex signal processing unit, 123 phase rotation unit, 124 multiplexing unit, 126 SFBC mapping unit.

The invention claimed is:

1. A transmission device comprising:
two or more transmission antennas; and
processing circuitry to perform space frequency block coding of a signal stream of a first time length,
wherein the processing circuitry includes
first processing circuitry to equally divide the signal stream into sub-streams of second time lengths and perform a cyclic shift of one or more sub-streams among the sub-streams in a time length in which a value divided by a primary modulation symbol interval of the sub-streams becomes a non-integer value,
second processing circuitry to output the sub-streams as they are, as output signals, perform complex signal processing on the sub-streams, the complex signal processing being time-axis inversion processing, complex conjugate processing and sign inversion processing, or the time-axis inversion processing and complex conjugate processing, and output as output signals the sub-streams on which the complex signal processing has been performed,
third processing circuitry to generate a repetitive signal that is a signal of a third time length in which signal arrangement is repeated in a time direction, for each of the output signals output from the second processing circuitry, and give a phase rotation to the repetitive signal, and
fourth processing circuitry to generate, for each of the transmission antennas, a transmission signal transmitted from the transmission antenna, by multiplexing the repetitive signals to which the phase rotation has been given, and
the third processing circuitry gives different phase rotations to the repetitive signals multiplexed to an identical transmission signal.

2. The transmission device according to claim 1, wherein the phase rotation is a phase rotation in which one over an integer of the third time length is a cycle.

3. The transmission device according to claim 1, wherein the two or more transmission antennas include a first transmission antenna and a second transmission antenna,
the second processing circuitry outputs, as they are, a first sub-stream and a second sub-stream that are the sub-streams, performs the time-axis inversion processing, the complex conjugate processing and the sign inversion processing on the second sub-stream, and performs the time-axis inversion processing and the complex conjugate processing on the first sub-stream,
the third processing circuitry generates a first repetitive signal that is the first sub-stream arranged repeatedly in the time direction and a second repetitive signal that is the second sub-stream arranged repeatedly in the time direction, gives the second repetitive signal a phase rotation with a phase rotation amount being 0, generates a third repetitive signal generated by arranging repeatedly, in the time direction, a signal generated by performing on the second sub-stream the time-axis inversion processing, the complex conjugate processing and the sign inversion processing and a fourth repetitive signal generated by arranging repeatedly, in the time direction, a signal generated by performing on the first sub-stream the time-axis inversion processing and the complex conjugate processing, and gives the third repetitive signal and the fourth repetitive signal a phase rotation with the third time length being one cycle, and the fourth processing circuitry generates a first transmission signal by multiplexing the first repetitive signal and the phase-rotated third repetitive signal, and generates a second transmission signal by multiplexing the second repetitive signal and the phase-rotated fourth repetitive signal, and the first transmission signal is transmitted from the first transmission antenna, and the second transmission signal is transmitted from the second transmission antenna.

4. A reception device that receives, from the transmission device according to claim 1, a transmission signal that is a signal stream on which space frequency block coding has been performed by the transmission device, the reception device comprising:

first processing circuitry to transform a reception signal into a frequency signal by discrete Fourier transform;

second processing circuitry to perform space frequency block decoding of the frequency signal between adjoining sub-carriers in a frequency domain to estimate a sub-stream that is a signal generated by equal division of the signal stream transmitted from the transmission device, and perform, on a result of the estimation of the sub-stream on which a cyclic shift is performed in the transmission device, a phase rotation to cancel the cyclic shift;

third processing circuitry to perform frequency-domain equalization processing on a basis of the result of the estimation of the sub-stream and the result of the estimation of the sub-stream on which the phase rotation has been performed; and fourth processing circuitry to perform inverse discrete Fourier transform on a result of the frequency-domain equalization processing.

5. A reception device that receives, from the transmission device according to claim 1, a transmission signal that is a signal stream on which space frequency block coding has been performed by the transmission device, the reception device comprising:

first processing circuitry to transform a reception signal into a frequency signal by discrete Fourier transform;

second processing circuitry to perform space frequency block decoding of the frequency signal between adjoining sub-carriers in a frequency domain to estimate a sub-stream that is a signal generated by equal division of the signal stream transmitted from the transmission device;

third processing circuitry to perform frequency-domain equalization processing on a basis of a result of the estimation of the sub-stream; and fourth processing circuitry to perform inverse discrete Fourier transform on the decoding result on which the frequency-domain equalization processing has been performed, wherein processing of canceling a cyclic shift in the transmission device is performed on a result of the inverse discrete Fourier transform.

6. A reception device that receives, from the transmission device according to claim 1, a transmission signal that is a signal stream on which space frequency block coding has been performed by the transmission device, the reception device comprising:

first processing circuitry to combine signal components for each phase rotation amount given in the transmission device, after temporally equal division of a reception signal;

second processing circuitry to transform signals combined by the first processing circuitry, into a frequency signal by discrete Fourier transform;

third processing circuitry to perform space frequency block decoding of the frequency signal between adjoining sub-carriers in a frequency domain to estimate a sub-stream that is a signal generated by equal division of the signal stream transmitted from the transmission device, and perform, on a result of the estimation of the sub-stream on which a cyclic shift is performed in the transmission device, a phase rotation to cancel the cyclic shift;

fourth processing circuitry to perform frequency-domain equalization processing on a basis of the result of the estimation of the sub-stream; and fifth processing circuitry to perform inverse discrete Fourier transform on the decoding result on which the frequency-domain equalization processing has been performed.

7. A reception device that receives, from the transmission device according to claim 1, to a transmission signal that is a signal stream on which space frequency block coding has been performed in the transmission device, the reception device comprising:

processing circuitry to transform a reception signal into a frequency signal by discrete Fourier transform;

to perform space frequency block decoding of the frequency signal between adjoining sub-carriers in a frequency domain to estimate a sub-stream that is a signal generated by equal division of the signal stream transmitted from the transmission device, and perform, on a result of the estimation of the sub-stream on which a cyclic shift is performed in the transmission device, a phase rotation to cancel the cyclic shift;

to perform frequency-domain equalization processing on a basis of an equivalent transmission channel matrix taking into consideration a remaining interference component in the decoding on a basis of the result of the estimation of the sub-stream; and to perform inverse discrete Fourier transform on the decoding result on which the frequency-domain equalization processing has been performed.

8. A communication system comprising:

the transmission device according to claim 1; and a reception device that receives, from the transmission device, a transmission signal that is a signal stream on which space frequency block coding has been performed by the transmission device, the reception device comprising:

first processing circuitry to transform a reception signal into a frequency signal by discrete Fourier transform;

second processing circuitry to perform space frequency block decoding of the frequency signal between adjoining sub-carriers in a frequency domain to estimate a sub-stream that is a signal generated by equal division of the signal stream transmitted from the transmission device, and perform, on a result of the estimation of the sub-stream on which a cyclic shift is performed in the transmission device, a phase rotation to cancel the cyclic shift;

third processing circuitry to perform frequency-domain equalization processing on a basis of the result of the estimation of the sub-stream and the result of the estimation of the sub-stream on which the phase rotation has been performed; and fourth processing circuitry to perform inverse discrete Fourier transform on a result of the frequency-domain equalization processing.

9. A communication system comprising:
the transmission device according to claim 1; and
a reception device that receives, from the transmission device, a transmission signal that is a signal stream on which space frequency block coding has been performed by the transmission device, the reception device comprising:
first processing circuitry to transform a reception signal into a frequency signal by discrete Fourier transform;
second processing circuitry to perform space frequency block decoding of the frequency signal between adjoining sub-carriers in a frequency domain to estimate a sub-stream that is a signal generated by equal division of the signal stream transmitted from the transmission device;
third processing circuitry to perform frequency-domain equalization processing on a basis of a result of the estimation of the sub-stream; and
fourth processing circuitry to perform inverse discrete Fourier transform on the decoding result on which the frequency-domain equalization processing has been performed,
wherein processing of canceling a cyclic shift in the transmission device is performed on a result of the inverse discrete Fourier transform.

10. A communication system comprising:
the transmission device according to claim 1; and
a reception device that receives, from the transmission device, a transmission signal that is a signal stream on which space frequency block coding has been performed in the transmission device, the reception device comprising:
processing circuitry
to transform a reception signal into a frequency signal by discrete Fourier transform;
to perform space frequency block decoding of the frequency signal between adjoining sub-carriers in a frequency domain to estimate a sub-stream that is a signal generated by equal division of the signal stream transmitted from the transmission device, and perform, on a result of the estimation of the sub-stream on which a cyclic shift is performed in the transmission device, a phase rotation to cancel the cyclic shift;
to perform frequency-domain equalization processing on a basis of an equivalent transmission channel matrix taking into consideration a remaining interference component in the decoding on a basis of the result of the estimation of the sub-stream; and
to perform inverse discrete Fourier transform on the decoding result on which the frequency-domain equalization processing has been performed.

11. A transmission device comprising:
two or more transmission antennas; and
processing circuitry to perform space frequency block coding of a signal stream of a first time length,
wherein the processing circuitry includes
first processing circuitry to equally divide the signal stream into sub-streams of second time lengths,
second processing circuitry to transform the sub-streams respectively into frequency signals by discrete Fourier transform,
third processing circuitry to generate, for each of the frequency signals, a complex-processed frequency signal that is a signal generated by performing, on the frequency signal, complex conjugate processing and sign inversion processing or a signal generated by performing, on the frequency signal, the complex conjugate processing, give first frequency signals and first complex-processed frequency signals a phase rotation in proportional to a frequency corresponding to a cyclic shift in a time domain, the first frequency signals being one or more frequency signals among the frequency signals and the first complex-processed frequency signals being the complex-processed frequency signals corresponding to the first frequency signals, and generate, for each of the transmission antennas, a frequency arrangement signal corresponding to a transmission signal transmitted by the transmission antenna, by performing, in a frequency domain, mapping of a second frequency signal that is the frequency signal other than the first frequency signals, a second complex-processed frequency signal that is the complex-processed frequency signal corresponding to the second frequency signal, the first frequency signals to which the phase rotation has been given, and the first complex-processed frequency signals to which the phase rotation has been given, and
fourth processing circuitry to transform the frequency arrangement signals respectively into time signals by inverse discrete Fourier transform, and
the third processing circuitry generates the frequency arrangement signals in such a manner that components of different frequency signals are mapped at positions adjoining in a frequency domain in the frequency arrangement signals and that each frequency signal in the frequency arrangement signals becomes a comb-shape.

12. A reception device that receives, from the transmission device according to claim 11, a transmission signal that is a signal stream on which space frequency block coding has been performed by the transmission device, the reception device comprising:
first processing circuitry to transform a reception signal into a frequency signal by discrete Fourier transform;
second processing circuitry to perform space frequency block decoding of the frequency signal between adjoining sub-carriers in a frequency domain to estimate a sub-stream that is a signal generated by equal division of the signal stream transmitted from the transmission device, and perform, on a result of the estimation of the sub-stream on which a cyclic shift is performed in the transmission device, a phase rotation to cancel the cyclic shift;
third processing circuitry to perform frequency-domain equalization processing on a basis of the result of the estimation of the sub-stream and the result of the estimation of the sub-stream on which the phase rotation has been performed; and
fourth processing circuitry to perform inverse discrete Fourier transform on a result of the frequency-domain equalization processing.

13. A reception device that receives, from the transmission device according to claim 11, a transmission signal that is a signal stream on which space frequency block coding has been performed by the transmission device, the reception device comprising:
first processing circuitry to transform a reception signal into a frequency signal by discrete Fourier transform;
second processing circuitry to perform space frequency block decoding of the frequency signal between adjoining sub-carriers in a frequency domain to estimate a sub-stream that is a signal generated by equal division of the signal stream transmitted from the transmission device;

third processing circuitry to perform frequency-domain equalization processing on a basis of a result of the estimation of the sub-stream; and fourth processing circuitry to perform inverse discrete Fourier transform on the decoding result on which the frequency-domain equalization processing has been performed, wherein processing of canceling a cyclic shift in the transmission device is performed on a result of the inverse discrete Fourier transform.

14. A reception device that receives, from the transmission device according to claim 11, a transmission signal that is a signal stream on which space frequency block coding has been performed by the transmission device, the reception device comprising:

first processing circuitry to combine signal components for each phase rotation amount given in the transmission device, after temporally equal division of a reception signal;

second processing circuitry to transform signals combined by the first processing circuitry, into a frequency signal by discrete Fourier transform;

third processing circuitry to perform space frequency block decoding of the frequency signal between adjoining sub-carriers in a frequency domain to estimate a sub-stream that is a signal generated by equal division of the signal stream transmitted from the transmission device, and perform, on a result of the estimation of the sub-stream on which a cyclic shift is performed in the transmission device, a phase rotation to cancel the cyclic shift;

fourth processing circuitry to perform frequency-domain equalization processing on a basis of the result of the estimation of the sub-stream; and fifth processing circuitry to perform inverse discrete Fourier transform on the decoding result on which the frequency-domain equalization processing has been performed.

15. A reception device that receives, from the transmission device according to claim 11, a transmission signal that is a signal stream on which space frequency block coding has been performed in the transmission device, the reception device comprising:

processing circuitry to transform a reception signal into a frequency signal by discrete Fourier transform;

to perform space frequency block decoding of the frequency signal between adjoining sub-carriers in a frequency domain to estimate a sub-stream that is a signal generated by equal division of the signal stream transmitted from the transmission device, and perform, on a result of the estimation of the sub-stream on which a cyclic shift is performed in the transmission device, a phase rotation to cancel the cyclic shift;

to perform frequency-domain equalization processing on a basis of an equivalent transmission channel matrix taking into consideration a remaining interference component in the decoding on a basis of the result of the estimation of the sub-stream; and to perform inverse discrete Fourier transform on the decoding result on which the frequency-domain equalization processing has been performed.

16. A communication system comprising:
the transmission device according to claim 11; and
a reception device that receives, from the transmission device, a transmission signal that is a signal stream on which space frequency block coding has been performed by the transmission device, the reception device comprising:

first processing circuitry to transform a reception signal into a frequency signal by discrete Fourier transform;

second processing circuitry to perform space frequency block decoding of the frequency signal between adjoining sub-carriers in a frequency domain to estimate a sub-stream that is a signal generated by equal division of the signal stream transmitted from the transmission device, and perform, on a result of the estimation of the sub-stream on which a cyclic shift is performed in the transmission device, a phase rotation to cancel the cyclic shift;

third processing circuitry to perform frequency-domain equalization processing on a basis of the result of the estimation of the sub-stream and the result of the estimation of the sub-stream on which the phase rotation has been performed; and fourth processing circuitry to perform inverse discrete Fourier transform on a result of the frequency-domain equalization processing.

17. A communication system comprising:
the transmission device according to claim 11; and
a reception device that receives, from the transmission device, a transmission signal that is a signal stream on which space frequency block coding has been performed by the transmission device, the reception device comprising:

first processing circuitry to transform a reception signal into a frequency signal by discrete Fourier transform;

second processing circuitry to perform space frequency block decoding of the frequency signal between adjoining sub-carriers in a frequency domain to estimate a sub-stream that is a signal generated by equal division of the signal stream transmitted from the transmission device;

third processing circuitry to perform frequency-domain equalization processing on a basis of a result of the estimation of the sub-stream; and fourth processing circuitry to perform inverse discrete Fourier transform on the decoding result on which the frequency-domain equalization processing has been performed, wherein processing of canceling a cyclic shift in the transmission device is performed on a result of the inverse discrete Fourier transform.

18. A communication system comprising:
the transmission device according to claim 11; and
a reception device that receives, from the transmission device, a transmission signal that is a signal stream on which space frequency block coding has been performed in the transmission device, the reception device comprising:

processing circuitry to transform a reception signal into a frequency signal by discrete Fourier transform;

to perform space frequency block decoding of the frequency signal between adjoining sub-carriers in a frequency domain to estimate a sub-stream that is a signal generated by equal division of the signal stream transmitted from the transmission device, and perform, on a result of the estimation of the sub-stream on which a cyclic shift is performed in the transmission device, a phase rotation to cancel the cyclic shift;

to perform frequency-domain equalization processing on a basis of an equivalent transmission channel matrix taking into consideration a remaining interference component in the decoding on a basis of the result of the estimation of the sub-stream; and to perform inverse discrete Fourier transform on the decoding result on which the frequency-domain equalization processing has been performed.

19. A transmission method in a transmission device that includes two or more transmission antennas and performs space frequency block coding of a signal stream of a first time length, the method comprising:

equally dividing the signal stream into sub-streams of second time lengths and performing a cyclic shift of one or more sub-streams among the sub-streams in a time length in which a value divided by a primary modulation symbol interval of the sub-streams becomes a non-integer value;

outputting the sub-streams as they are, as output signals, performing, on the sub-stream, complex signal processing that is time-axis inversion processing, complex conjugate processing and sign inversion processing, or the time-axis inversion processing and complex conjugate processing, and outputting as output signals the sub-streams on which the complex signal processing has been performed;

generating a repetitive signal, which is a signal of a third time length in which signal arrangement is repeated in a time direction, for each of the output signals and giving a phase rotation to the repetitive signal; and generating, for each of the transmission antennas, a transmission signal transmitted from the transmission antenna, by multiplexing the repetitive signals to which the phase rotation has been given, wherein different phase rotations are given to repetitive signals multiplexed to an identical transmission signal.

20. A reception method of receiving a transmission signal transmitted from a transmission device by the transmission method according to claim 19, the method comprising:

transforming a reception signal into a frequency signal by discrete Fourier transform;

performing space frequency block decoding of the frequency signal between adjoining sub-carriers in a frequency domain to estimate a sub-stream that is a signal generated by equal division of a signal stream to be a base of the transmission signal transmitted from the transmission device, and performing, on a result of the estimation of the sub-stream on which a cyclic shift is performed in the transmission device, a phase rotation to cancel the cyclic shift;

performing frequency-domain equalization processing on a basis of the result of the estimation of the sub-stream; and performing inverse discrete Fourier transform on the result of the estimation of the sub-stream on which the frequency-domain equalization processing has been performed.

* * * * *